(12) United States Patent
Luo et al.

(10) Patent No.: US 12,308,935 B2
(45) Date of Patent: May 20, 2025

(54) SUPPORTING ADAPTIVE FREQUENCY DOMAIN RESOURCE CONFIGURATION FOR A RELAY NODE

(71) Applicant: QUALCOMM Incorporated, San Diego, CA (US)

(72) Inventors: Jianghong Luo, Skillman, NJ (US); Navid Abedini, Basking Ridge, NJ (US); Wanshi Chen, San Diego, CA (US); Tao Luo, San Diego, CA (US); Luca Blessent, Whitehouse Station, NJ (US); Naeem Akl, Somerville, NJ (US); Karl Georg Hampel, Jersey City, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 729 days.

(21) Appl. No.: 17/571,318

(22) Filed: Jan. 7, 2022

(65) Prior Publication Data

US 2022/0286196 A1  Sep. 8, 2022

Related U.S. Application Data

(60) Provisional application No. 63/158,250, filed on Mar. 8, 2021.

(51) Int. Cl.
*H04B 7/155* (2006.01)
*H04W 72/044* (2023.01)
(Continued)

(52) U.S. Cl.
CPC ...... *H04B 7/15542* (2013.01); *H04W 72/044* (2013.01); *H04W 72/23* (2023.01); *H04W 72/542* (2023.01)

(58) Field of Classification Search
CPC . H04W 72/542; H04W 72/23; H04W 72/044; H04B 7/15542
(Continued)

(56) References Cited

U.S. PATENT DOCUMENTS

2017/0289973 A1* 10/2017 Yang ............... H04L 5/0048
2020/0146083 A1* 5/2020 Wang ............... H04B 7/155
(Continued)

FOREIGN PATENT DOCUMENTS

WO   WO-2020034335 A1   2/2020

OTHER PUBLICATIONS

3GPP TSG-RAN WG1 Meeting #95 R1-1813566 IAB resource allocation and multiplexing (Year: 2018).*
(Continued)

*Primary Examiner* — William Nealon
(74) *Attorney, Agent, or Firm* — Holland & Hart LLP

(57) ABSTRACT

Methods, systems, and devices for wireless communication are described. A control node may transmit, to a first relay node, an indication to communicate according to a first resource configuration of a set of resource configurations, where each resource configuration of the set is associated with a respective resource block set and a respective time domain pattern. In some examples, each time domain pattern may indicate, for each symbol of a respective set of symbols associated with each time domain pattern, a resource type associated with availability of each symbol for communication by the first relay node with a second relay node. The first relay node may communicate according to the first resource configuration based on receiving the indication to communicate according to the first resource configuration.

30 Claims, 15 Drawing Sheets

(51) Int. Cl.
*H04W 72/23* (2023.01)
*H04W 72/542* (2023.01)

(58) Field of Classification Search
USPC .......................................... 370/315
See application file for complete search history.

(56) References Cited

U.S. PATENT DOCUMENTS

| | | | |
|---|---|---|---|
| 2021/0068096 A1* | 3/2021 | Abedini | H04W 40/36 |
| 2021/0212050 A1* | 7/2021 | Lu | H04L 5/0053 |
| 2021/0227552 A1* | 7/2021 | Abedini | H04B 7/024 |
| 2022/0248399 A1* | 8/2022 | You | H04L 5/0096 |
| 2022/0295456 A1* | 9/2022 | Liu | H04W 92/20 |

OTHER PUBLICATIONS

3GPP TSG RAN WG1 #96bis R1-1904642 Mechanisms for resource multiplexing among backhaul and access links (Year: 2019).*
International Search Report and Written Opinion—PCT/US2022/011837—ISA/EPO—May 3, 2022.

* cited by examiner

SUPPORTING ADAPTIVE FREQUENCY DOMAIN RESOURCE CONFIGURATION FOR A RELAY NODE

CROSS REFERENCE

The present application for patent claims the benefit of U.S. Provisional Patent Application No. 63/158,250 by LUO et al., entitled "SUPPORTING ADAPTIVE FREQUENCY DOMAIN RESOURCE CONFIGURATION FOR A RELAY NODE," filed Mar. 8, 2021, assigned to the assignee hereof, and expressly incorporated by reference herein.

FIELD OF TECHNOLOGY

The following relates to wireless communication, and more specifically to supporting adaptive frequency domain resource configuration for a relay node.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, an integrated access backhaul (IAB) nodes may be connected for communication in a hierarchical manner. Configuration of resources for communication by the IAB nodes may present challenges in latency, signaling overhead, or power consumption.

SUMMARY

The described techniques relate to improved methods, systems, devices, and apparatuses that supports adaptive frequency domain resource configuration for a relay node. Generally, the described techniques provide for a control node to activate a resource configuration at a relay node. For instance, the control node may transmit, to a first relay node, an indication of a set of resource configurations for the first relay node, where each resource configuration of the set is associated with a respective resource block set and a respective time domain pattern. Each time domain pattern may indicate, for each symbol of a respective set of symbols associated with each time domain pattern, a resource type associated with availability of each symbol for communication by the first relay node with a second relay node.

A method for wireless communication at a first relay node is described. The method may include receiving, from a control node, an indication to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node and communicating according to the first resource configuration based on receiving the indication to communicate according to the first resource configuration.

An apparatus for wireless communication at a first relay node is described. The apparatus may include a processor, memory coupled with the processor, and instructions stored in the memory. The instructions may be executable by the processor to cause the apparatus to receive, from a control node, an indication to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node and communicate according to the first resource configuration based on receiving the indication to communicate according to the first resource configuration.

Another apparatus for wireless communication at a first relay node is described. The apparatus may include means for receiving, from a control node, an indication to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node and means for communicating according to the first resource configuration based on receiving the indication to communicate according to the first resource configuration.

A non-transitory computer-readable medium storing code for wireless communication at a first relay node is described. The code may include instructions executable by a processor to receive, from a control node, an indication to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node and communicate according to the first resource configuration based on receiving the indication to communicate according to the first resource configuration.

Some examples of the method, apparatuses, and non-transitory computer-readable medium described herein may further include operations, features, means, or instructions for receiving, from the control node, an indication to communicate according to a second resource configuration of the set of resource configurations and communicating according to the second resource configuration based on receiving the indication to communicate according to the second resource configuration.

In some examples of the method, apparatuses, and non-transitory computer-readable medium described herein, receiving the indication to communicate according to the first resource configuration and the indication to communicate according to the second resource configuration may include operations, features, means, or instructions for receiving, from the control node, an indication to communicate according to a subset of the set of resource configurations, where the subset includes the first resource configuration and the second resource configuration.

In some examples of the method, apparatuses, and non-transitory computer-readable medium described herein, the subset of the set of resource configurations excludes at least one resource configuration of the set of resource configurations.

Some examples of the method, apparatuses, and non-transitory computer-readable medium described herein may further include operations, features, means, or instructions for refraining from communicating according to the at least one resource configuration based on the subset of the set of resource configurations excluding the at least one resource configuration.

Some examples of the method, apparatuses, and non-transitory computer-readable medium described herein may further include operations, features, means, or instructions for determining a default resource type for the at least one resource configuration of the set of resource configurations.

In some examples of the method, apparatuses, and non-transitory computer-readable medium described herein, the subset of the set of resource configurations includes each resource configuration of the set of resource configurations that may be an uplink resource configuration or each resource configuration of the set of resource configurations that may be a downlink resource configuration.

In some examples of the method, apparatuses, and non-transitory computer-readable medium described herein, a first set of symbols associated with the first resource configuration at least partially overlaps with a second set of symbols associated with the second resource configuration in time, frequency, or both.

In some examples of the method, apparatuses, and non-transitory computer-readable medium described herein, a first set of symbols associated with the first resource configuration may be non-overlapping with a second set of symbols associated with the second resource configuration in time, frequency, or both.

Some examples of the method, apparatuses, and non-transitory computer-readable medium described herein may further include operations, features, means, or instructions for receiving, from the control node, an indication to communicate according to a second resource configuration of the set of resource configurations after receiving the indication to communicate according to the first resource configuration, ceasing communicating according to the first resource configuration based on receiving the indication to communicate according to the second resource configuration, and communicating according to the second resource configuration based on receiving the indication to communicate according to the second resource configuration.

Some examples of the method, apparatuses, and non-transitory computer-readable medium described herein may further include operations, features, means, or instructions for transmitting, to the control node, a request to communicate according to the first resource configuration, where the indication to communicate according to the first resource configuration may be received based on transmitting the request.

Some examples of the method, apparatuses, and non-transitory computer-readable medium described herein may further include operations, features, means, or instructions for receiving, from the control node, an indication to cease communicating according to the first resource configuration.

Some examples of the method, apparatuses, and non-transitory computer-readable medium described herein may further include operations, features, means, or instructions for transmitting, to the control node, a request to cease communicating according to the first resource configuration, where receiving the indication to cease communicating according to the first resource configuration may be based on transmitting the request.

In some examples of the method, apparatuses, and non-transitory computer-readable medium described herein, receiving the indication to cease communicating according to the first resource configuration may include operations, features, means, or instructions for receiving, from the control node, an indication to cease communicating according to a subset of the set of resource configurations, where the subset of the set of resource configurations includes the first resource configuration.

In some examples of the method, apparatuses, and non-transitory computer-readable medium described herein, the subset of the set of resource configurations excludes at least one resource configuration of the set of resource configurations.

Some examples of the method, apparatuses, and non-transitory computer-readable medium described herein may further include operations, features, means, or instructions for communicating according to the at least one resource configuration of the set of resource configurations based on the subset of the set of resource configurations excluding the at least one resource configuration.

In some examples of the method, apparatuses, and non-transitory computer-readable medium described herein, setting, based on receiving the indication to communicate according to the first resource configuration, a timer, where communicating according to the first resource configuration occurs while the timer may be running.

Some examples of the method, apparatuses, and non-transitory computer-readable medium described herein may further include operations, features, means, or instructions for ceasing communicating according to the first resource configuration based on the timer stopping.

Some examples of the method, apparatuses, and non-transitory computer-readable medium described herein may further include operations, features, means, or instructions for resetting the timer while the timer may be running based on one or more criteria.

Some examples of the method, apparatuses, and non-transitory computer-readable medium described herein may further include operations, features, means, or instructions for determining a default resource type for a set of resources excluded from each resource configuration of the set of resource configurations.

In some examples of the method, apparatuses, and non-transitory computer-readable medium described herein, the indication to communicate may be provided via radio resource control signaling, medium access control (MAC) control element signaling, downlink control information signaling, F1 application protocol (F1AP) signaling, or a combination thereof.

In some examples of the method, apparatuses, and non-transitory computer-readable medium described herein, the indication to communicate includes an indication of one or more criteria for communicating according to the first resource configuration and communicating according to the first resource configuration may be based on whether the one or more criteria may be satisfied.

In some examples of the method, apparatuses, and non-transitory computer-readable medium described herein, the one or more criteria includes a detection of a collision between a transmission associated with the first resource configuration and another transmission, an interference metric being above a threshold amount, or both.

In some examples of the method, apparatuses, and non-transitory computer-readable medium described herein, the one or more criteria includes ultra-reliable low-latency communication traffic for the communicating.

In some examples of the method, apparatuses, and non-transitory computer-readable medium described herein, the one or more criteria includes a detection of entering a location or zone, a speed associated with the first relay node satisfying a threshold, or both.

In some examples of the method, apparatuses, and non-transitory computer-readable medium described herein, a first resource block set associated with the first resource configuration at least partially overlaps in time, frequency, or both with a second resource block set associated with a second resource configuration of the set of resource configurations.

In some examples of the method, apparatuses, and non-transitory computer-readable medium described herein, a first resource block set associated with the first resource configuration may be non-overlapping in time and frequency with a second resource block set associated with a second resource configuration of the set of resource configurations.

In some examples of the method, apparatuses, and non-transitory computer-readable medium described herein, a first size of a first resource block set associated with the first resource configuration may be the same as a second size of a second resource block set associated with a second resource configuration of the set of resource configurations.

In some examples of the method, apparatuses, and non-transitory computer-readable medium described herein, a first size of a first resource block set associated with the first resource configuration may be different from a second size of a second resource block set associated with a second resource configuration of the set of resource configurations.

In some examples of the method, apparatuses, and non-transitory computer-readable medium described herein, a first time domain pattern associated with the first resource configuration may be different from a second time domain pattern associated with a second resource configuration of the set of resource configurations.

In some examples of the method, apparatuses, and non-transitory computer-readable medium described herein, a first time domain pattern associated with the first resource configuration may be the same as a second time domain pattern associated with a second resource configuration of the set of resource configurations.

In some examples of the method, apparatuses, and non-transitory computer-readable medium described herein, the second relay node may be a child node of the first relay node.

In some examples of the method, apparatuses, and non-transitory computer-readable medium described herein, the control node includes a central control node or a parent node of the first relay node.

In some examples of the method, apparatuses, and non-transitory computer-readable medium described herein, the central control node includes an integrated access and backhaul donor central unit.

In some examples of the method, apparatuses, and non-transitory computer-readable medium described herein, the first relay node includes an integrated access and backhaul node.

In some examples of the method, apparatuses, and non-transitory computer-readable medium described herein, the resource type corresponds to one of a set of resource types including a first resource type associated with a symbol being available for communication by the first relay node, a second resource type associated with the symbol being unavailable for communication by the first relay node, and a third resource type associated with the symbol being conditionally available for communication by the first relay node.

A method for wireless communication at a control node is described. The method may include transmitting, to a first relay node, an indication of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node and transmitting, to the first relay node, an indication to communicate according to a first resource configuration of the set of resource configurations.

An apparatus for wireless communication at a control node is described. The apparatus may include a processor, memory coupled with the processor, and instructions stored in the memory. The instructions may be executable by the processor to cause the apparatus to transmit, to a first relay node, an indication of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node and transmit, to the first relay node, an indication to communicate according to a first resource configuration of the set of resource configurations.

Another apparatus for wireless communication at a control node is described. The apparatus may include means for transmitting, to a first relay node, an indication of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node and means for transmitting, to the first relay node, an indication to communicate according to a first resource configuration of the set of resource configurations.

A non-transitory computer-readable medium storing code for wireless communication at a control node is described. The code may include instructions executable by a processor to transmit, to a first relay node, an indication of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node and transmit, to the first relay node, an indication to communicate according to a first resource configuration of the set of resource configurations.

Some examples of the method, apparatuses, and non-transitory computer-readable medium described herein may further include operations, features, means, or instructions for receiving the indication of the set of resource configurations for the first relay node from a parent node of the control node or a central control node.

Some examples of the method, apparatuses, and non-transitory computer-readable medium described herein may further include operations, features, means, or instructions for receiving the indication to communicate according to the first resource configuration from a parent node of the control node or a central control node.

Some examples of the method, apparatuses, and non-transitory computer-readable medium described herein may further include operations, features, means, or instructions for transmitting, to the first relay node, an indication to communicate according to a second resource configuration of the set of resource configurations after transmitting the indication to communicate according to the first resource configuration.

In some examples of the method, apparatuses, and non-transitory computer-readable medium described herein, transmitting the indication to communicate according to the first resource configuration and the indication to communicate according to the second resource configuration may include operations, features, means, or instructions for transmitting, to the first relay node, an indication to communicate according to a subset of the set of resource configurations, where the subset includes the first resource configuration and the second resource configuration.

In some examples of the method, apparatuses, and non-transitory computer-readable medium described herein, the subset of the set of resource configurations excludes at least one resource configuration of the set of resource configurations.

In some examples of the method, apparatuses, and non-transitory computer-readable medium described herein, the subset of the set of resource configurations includes each resource configuration of the set of resource configurations that may be an uplink resource configuration or each resource configuration of the set of resource configurations that may be a downlink resource configuration.

Some examples of the method, apparatuses, and non-transitory computer-readable medium described herein may further include operations, features, means, or instructions for receiving, from the first relay node, a request to communicate according to the first resource configuration, where the indication to communicate according to the first resource configuration may be transmitted based on receiving the request.

Some examples of the method, apparatuses, and non-transitory computer-readable medium described herein may further include operations, features, means, or instructions for transmitting, to the first relay node, an indication to cease communicating according to the first resource configuration.

Some examples of the method, apparatuses, and non-transitory computer-readable medium described herein may further include operations, features, means, or instructions for receiving, from the first relay node, a request to cease communicating according to the first resource configuration, where transmitting the indication to cease communicating according to the first resource configuration may be based on receiving the request.

In some examples of the method, apparatuses, and non-transitory computer-readable medium described herein, transmitting the indication to cease communicating according to the first resource configuration may include operations, features, means, or instructions for transmitting, to the first relay node, an indication to cease communicating according to a subset of the set of resource configurations, where the subset of the set of resource configurations includes the first resource configuration.

In some examples of the method, apparatuses, and non-transitory computer-readable medium described herein, the subset of the set of resource configurations excludes at least one resource configuration of the set of resource configurations.

In some examples of the method, apparatuses, and non-transitory computer-readable medium described herein, the indication to communicate may be provided via radio resource control signaling, medium access control (MAC) control element signaling, downlink control information signaling, F1 application protocol (F1AP) signaling, or a combination thereof.

In some examples of the method, apparatuses, and non-transitory computer-readable medium described herein, the indication to communicate includes an indication of one or more criteria for communicating according to the first resource configuration.

In some examples of the method, apparatuses, and non-transitory computer-readable medium described herein, the one or more criteria includes a detection of a collision between a transmission associated with the first resource configuration and another transmission, an interference metric being above a threshold amount, or both.

In some examples of the method, apparatuses, and non-transitory computer-readable medium described herein, the one or more criteria includes ultra-reliable low-latency communication traffic for the communicating.

In some examples of the method, apparatuses, and non-transitory computer-readable medium described herein, the one or more criteria includes a detection of entering a location or zone, a speed associated with the first relay node satisfying a threshold, or both.

In some examples of the method, apparatuses, and non-transitory computer-readable medium described herein, the resource block set associated with the first resource configuration at least partially overlaps in time, frequency, or both with the resource block set associated with a second resource configuration of the set of resource configurations.

In some examples of the method, apparatuses, and non-transitory computer-readable medium described herein, a first resource block set associated with the first resource configuration may be non-overlapping in time and frequency with a second resource block set associated with a second resource configuration of the set of resource configurations.

In some examples of the method, apparatuses, and non-transitory computer-readable medium described herein, a first size of a first resource block set associated with the first resource configuration may be the same as a second size of a second resource block set associated with a second resource configuration of the set of resource configurations.

In some examples of the method, apparatuses, and non-transitory computer-readable medium described herein, a first size of a first resource block set associated with the first resource configuration may be different from a second size of a second resource block set associated with a second resource configuration of the set of resource configurations.

In some examples of the method, apparatuses, and non-transitory computer-readable medium described herein, a first time domain pattern associated with the first resource configuration may be different from a second time domain pattern associated with a second resource configuration of the set of resource configurations.

In some examples of the method, apparatuses, and non-transitory computer-readable medium described herein, a first time domain pattern associated with the first resource configuration may be the same as a second time domain pattern associated with a second resource configuration of the set of resource configurations.

In some examples of the method, apparatuses, and non-transitory computer-readable medium described herein, the resource type corresponds to one of a set of resource types including a first resource type associated with a symbol being available for communication by the first relay node, a second resource type associated with the symbol being unavailable for communication by the first relay node, and a third resource type associated with the symbol being conditionally available for communication by the first relay node.

In some examples of the method, apparatuses, and non-transitory computer-readable medium described herein, the second relay node may be a child node of the first relay node.

In some examples of the method, apparatuses, and non-transitory computer-readable medium described herein, the control node includes a central control node or a parent node of the first relay node.

In some examples of the method, apparatuses, and non-transitory computer-readable medium described herein, the central control node includes an integrated access and backhaul donor central unit.

In some examples of the method, apparatuses, and non-transitory computer-readable medium described herein, the first relay node includes an integrated access and backhaul node.

DETAILED DESCRIPTION

In some examples, a first relay node may communicate with a second relay node (e.g., a child node of the first relay node) according to a resource configuration. The resource configuration may be associated with a respective resource block (RB) set and a respective time domain pattern. Each time domain pattern may indicate, for each symbol of a respective set of symbols associated with each time domain pattern, a resource type associated with availability of each symbol for communication by the first relay node with a second relay node.

In some examples, a control node (e.g., a central control node and/or a parent node of the first relay node) may transmit, to the first relay node, an indication of a resource configuration to configure the first relay node for communication according to the resource configuration. To update the resource configuration, the control node may transmit an updated resource configuration to the first relay node. However, transmitting the indication of the updated resource configuration to the first relay node each time the resource configuration at the first relay node is to be updated may be associated with increased latency or overhead.

According to various aspects described herein, the control node may transmit an indication of a set of resource configurations for the first relay node and, when the resource configuration at the first relay node is to be updated, the control node may transmit an indication to communicate according to one or more of the set of resource configurations (e.g., the control node may transmit an indication to activate the one or more of the set of resource configurations). The indication to communicate according to the one or more of the set of resource configurations may be associated with a lower latency or a lower overhead than indicating an updated resource configuration each time the resource configuration of the first relay node is to be communicated.

Aspects of the disclosure are initially described in the context of wireless communications systems. Additional aspects of the disclosure are described in the context of a node configuration scheme, resource configuration schemes, another wireless communications system, and a process flow. Aspects of the disclosure are further illustrated by and described with reference to apparatus diagrams, system diagrams, and flowcharts that relate to supporting adaptive frequency domain resource configuration for a relay node.

Figure 1:
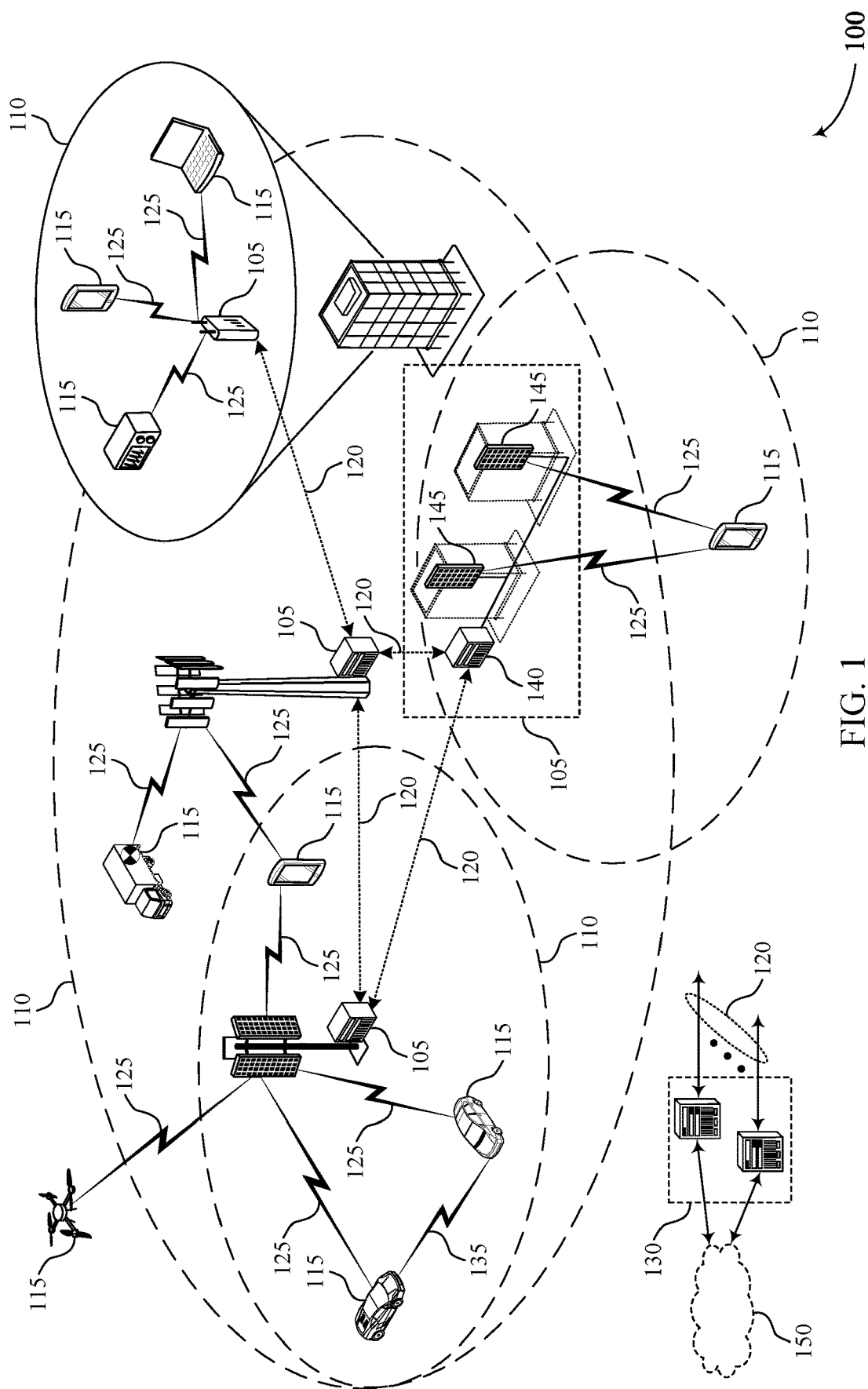
FIG. 1 illustrates an example of a wireless communications system that supports adaptive frequency domain resource configuration for a relay node in accordance with aspects of the present disclosure.

FIG. 1 illustrates an example of a wireless communications system 100 that supports adaptive frequency domain resource configuration for a relay node in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include a symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of a structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a first relay node (e.g., a base station 105) may communicate with a second relay node (e.g., a child node of the first relay node, which may be an example of a base station 105) according to a resource configuration. The resource configuration may be associated with a respective resource block (RB) set and a respective time domain pattern. Each time domain pattern may indicate, for each symbol of a respective set of symbols associated with each time domain pattern, a resource type associated with availability of each symbol for communication by the first relay node with a second relay node.

In some examples, a control node (e.g., a central control node and/or a parent node of the first relay node, which may be an example of a base station 105) may transmit, to the first relay node, an indication of a resource configuration to configure the first relay node with the resource configuration. To update the resource configuration, the control node may transmit an updated resource configuration to the first relay node. However, transmitting the indication of the updated resource configuration to the first relay node each time the resource configuration at the first relay node is to be updated may be associated with a latency above a threshold amount or an overhead above a threshold amount.

According to various aspects described herein, the control node may transmit an indication of a set of resource configurations for the first relay node and, when the resource configuration at the first relay node is to be updated, the control node may transmit an indication to communicate according to one or more of the set of resource configurations (e.g., the control node may transmit an indication to activate the one or more of the set of resource configurations). The indication to communicate according to the one or more of the set of resource configurations may be associated with a lower latency or a lower overhead than indicating an updated resource configuration each time the resource configuration of the first relay node is to be communicated.

Figure 2:
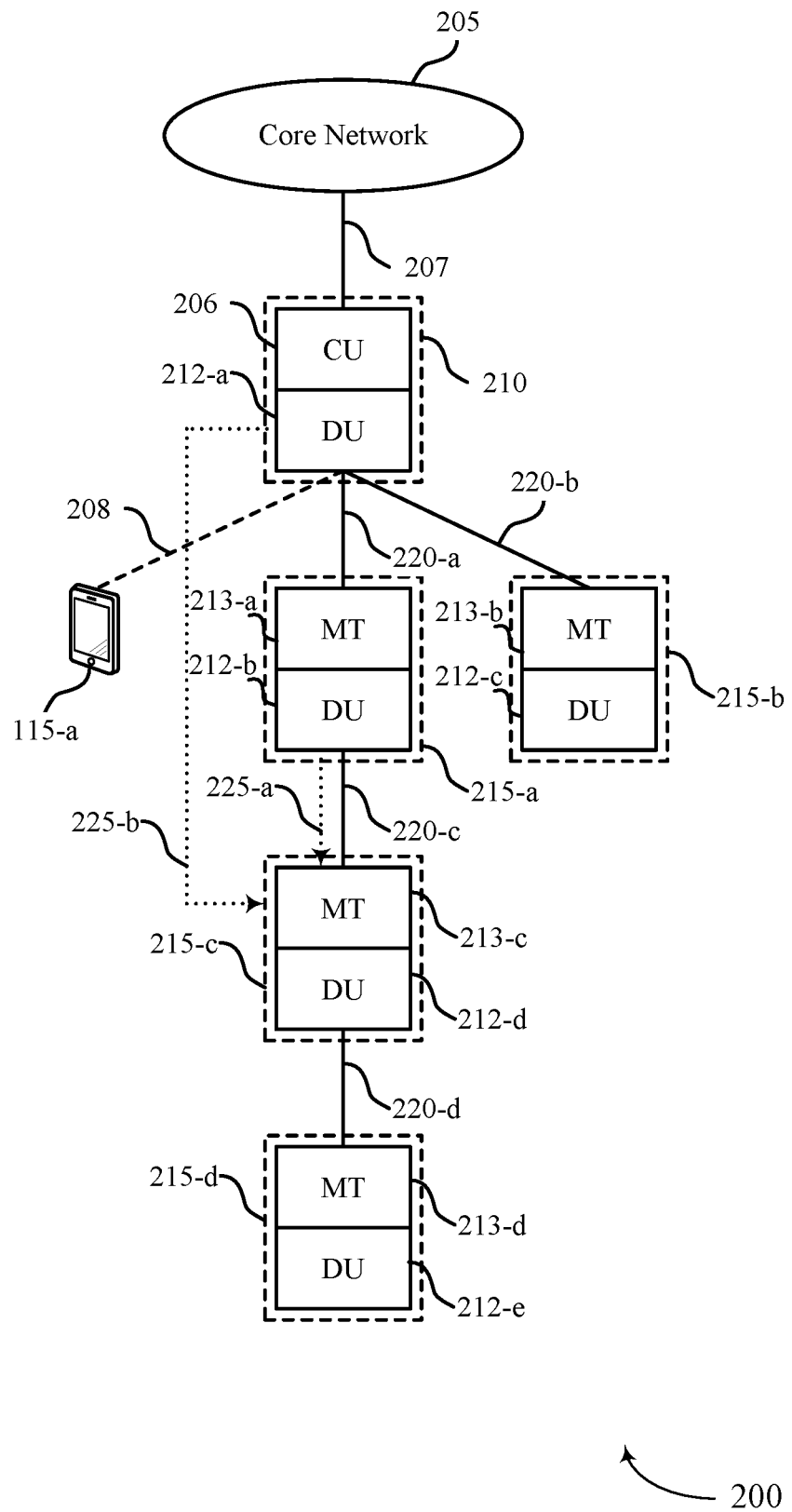
FIG. 2 illustrates an example of a node configuration scheme that supports adaptive frequency domain resource configuration for a relay node in accordance with aspects of the present disclosure.

FIG. 2 illustrates an example of a node configuration scheme 200 that supports adaptive frequency domain resource configuration for a relay node in accordance with aspects of the present disclosure. In some examples, node configuration scheme 200 may implement one or more aspects of FIG. 1. For instance, one or more of central control node 210 and relay nodes 215-a, 215-b, 215-c, and 215-d may be an example of a base station 105 as described with reference to FIG. 1 and UE 115-a may be an example of a UE 115 as described with reference to FIG. 1.

Core network 205 may be coupled (e.g., via a wired connection such as a fiber-optic connection) to a central unit (CU) 206 of central control node 210 via communication link 207. A distributed unit (DU) 212-a of central control node 210 may be coupled with UE 115-a via communication link 208, coupled with a mobile terminal (MT) 213-a of relay node 215-a via communication link 220-a, and coupled with an MT 213-b of relay node 215-b via communication link 220-b. Relay node 215-a may include a DU 212-b and relay node 215-b may include a DU 212-c. The DU 212-b of relay node 215-a may be coupled with an MT 213-c of relay node 215-c via communication link 220-c and a DU 212-c of relay node 215-c may be coupled with an MT 213-d of relay node 215-d via communication link 220-d. Relay node 215-d may include a DU 212-e.

In some examples, central control node 210 may be a parent node of relay nodes 215-a and 215-b (e.g., relay nodes 215-a and 215-b may be child nodes of central control node 210). Relay node 215-a may be a parent node of relay node 215-c (e.g., relay node 215-c may be a child node of relay node 215-a) and relay node 215-c may be a parent node of relay node 215-d (e.g., relay node 215-d may be a child node of relay node 215-c).

In some examples, relay node 215-c (e.g., the DU 212-d of relay node 215-c) may communicate with relay node 215-d (e.g., the MT 213-d of relay node 215-d) according to a resource configuration. The resource configuration may be associated with a respective RB set and a respective time domain pattern. Each time domain pattern may indicate, for each symbol of a respective set of symbols associated with each time domain pattern, a resource type associated with availability of each symbol for communication by relay node 215-c with relay node 215-d.

In some examples, relay node 215-a may transmit, to relay node 215-c (e.g., from the DU 212-b of relay node 215-a to the MT 213-c of relay node 215-c), an indication of a resource configuration to configure the relay node 215-c with the resource configuration. Additionally, or alternatively, central control node 210 may transmit, to relay node 215-c, an indication of a resource configuration to configure relay node 215-c with the resource configuration. To update the resource configuration, the relay node 215-a or central control node 210 may transmit an updated resource configuration to the relay node 215-c. However, transmitting the indication of the updated resource configuration to the relay node 215-c each time the resource configuration at relay node 215-c is to be updated may be associated with increased latency or overhead.

In order to decrease latency and/or overhead, relay node 215-a or central control node 210 may transmit an indication of a set of resource configurations for relay node 215-c. When the resource configuration at the relay node 215-c is to be updated, relay node 215-a may transmit an indication 225-a to communicate according to one or more of the set of resource configurations (e.g., relay node 215-a may transmit an indication to activate the one or more of the set of resource configurations). Additionally, or alternatively, central control node 210 may transmit an indication 225-b to communicate according to one or more of the set of resource configurations (e.g., relay node 215-a may relay an indication to activate the one or more of the set of resource configurations). The indication 225-a or 225-b to communicate according to the one or more of the set of resource configurations may be associated with a lower latency or a lower overhead than indicating an updated resource configuration each time the resource configuration of the relay node 215-c is to be communicated.

In some examples, central control node 210 may be an integrated access and backhaul (IAB) donor. An IAB donor may be an enhanced gNB node with functions to control an IAB-network. The CU 206 may be a central entity that controls the portions of or the entire IAB-network through configuration (e.g., The CU 206 may hold RRC and/or PDCP layer functions). A DU 212 (e.g., DU 212-a, 212-b, 212-c, 212-d, or 212-e) may be a schedule node that schedules child nodes of an IAB-donor. A DU 212 may include radio link control (RLC) functions, medium access control (MAC) functions, physical (PHY) layer functions, or any combination thereof.

In some examples, relay nodes 215-a, 215-b, 215-c, and 215-d may be IAB nodes. An IAB node may be a layer 2 (L2) relay node that includes DU 212 functions and/or MT 213 functions. An MT (e.g., which may be referred to as a mobile-termination) may be a scheduled node similar to a UE 115 in one or more aspects and may be scheduled by a parent IAB node or an IAB donor. The DU 212 may be a scheduling node that schedules child nodes of an IAB node. In some examples, communication link 208 may be referred to as a wireless access link and communication links 220-a, 220-b, 220-c, and 220-d may be referred to as wireless backhaul links.

In some examples, an IAB node may have duplex capability. For instance, time division multiplexing (TDM) may be used between parent backhaul link and child links. Enhanced duplex capability may support one or more simultaneous operations over a pair of an MT component carrier (CC) and a DU cell. A TDM mode may support an active parent backhaul link (e.g., in which a parent node of an IAB node communicates with the IAB node) and/or an active child link (e.g., in which a child node of an IAB node communicates with the IAB node). A first spatial division multiplexing (SDM) mode (e.g., a half-duplex mode) may support an IAB node simultaneously receiving transmissions from child nodes and parent nodes of the IAB node (e.g., MT-RX/DU-RX) or simultaneously transmitting transmissions to child nodes and parent nodes of the IAB node (e.g., MT-RX/DU-RX). A second SDM mode (e.g., full-duplex) may support an IAB node simultaneously transmitting transmissions to a child node while receiving transmissions from a parent node (e.g., MT-RX/DU-TX) and/or simultaneously receiving transmissions from a child node while transmitting transmissions to a parent node (e.g., MT-TX/DU-RX). In some examples, the second SDM mode may support the communication supported by the first SDM mode (e.g., MT-RX, DU-RX) and the TDM mode and the first SDM mode may support the communication supported by the TDM mode.

Figure 3A:
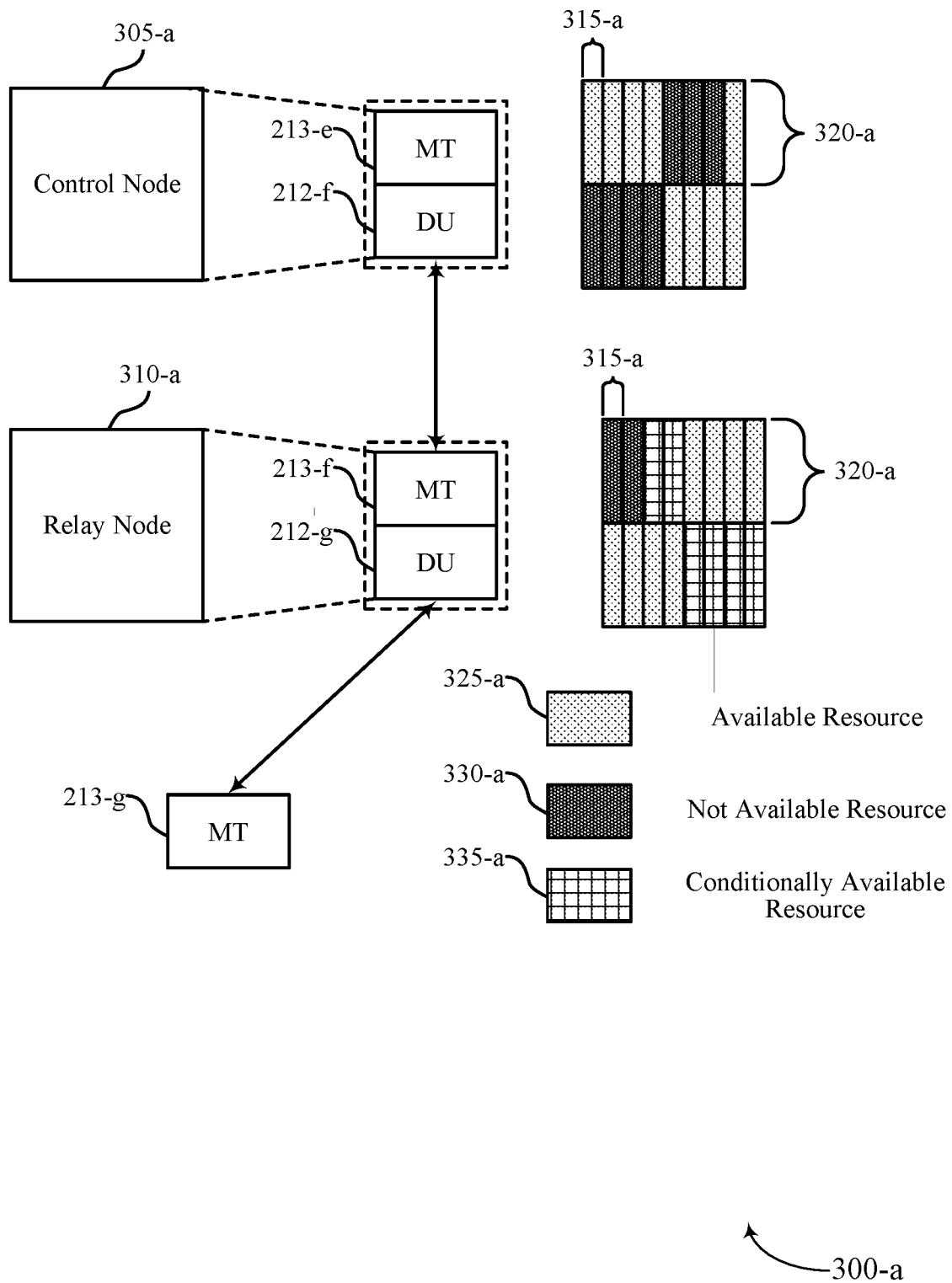
FIGS. 3A and 3B illustrate examples of resource configuration schemes that supports adaptive frequency domain resource configuration for a relay node in accordance with aspects of the present disclosure.

FIG. 3A illustrates an example of a resource configuration scheme 300-a that supports adaptive frequency domain resource configuration for a relay node in accordance with aspects of the present disclosure. In some examples, resource configuration scheme 300-a may implement one or more aspects of wireless communications system 100 and/or resource configuration scheme 300-a. For instance, control node 305-a and relay node 310-a may each be an example of a relay node 215 as described with reference to FIG. 2 and/or a base station 105 as described with reference to FIG. 1. In some examples, MT 213-e, MT 213-f, and MT 213-g may each be an example of an MT 213 as described with reference to FIG. 2 and DU 212-f and 212-g may each be an example of a DU 212 as described with reference to FIG. 2. Additionally, or alternatively, MT 213-g may be an example of a UE 115 as described with reference to FIG. 1.

Control node 305-a may include an MT 213-e and a DU 212-f and relay node 310-a may include an MT 213-f and a DU 212-g. Generally, the DU 212-f of the control node 305-a may be configured to communicate with the MT 213-f of the relay node 310-a and the DU 212-g of the relay node 310-a may be configured to communicate with an MT 213-g (e.g., a UE 115 or a relay node 215). Generally, control node 305-a may be a parent node of relay node 310-a (e.g., relay node 310-a may be a child node of control node 305-a).

In some examples, control node 305-a may be configured with a resource configuration. The resource configuration may include a time domain pattern associated with a set of symbols (e.g., symbols 315-a) and one or more RB sets 320-a. The time domain pattern may indicate, for each symbol 315-a of the set of symbols, a resource type of a set of resource types associated with availability of each symbol 315-a for communication by control node 305-a with relay node 310-a. For instance, a given symbol 315-a may be associated with a first resource type of the set of resource types that is associated with the symbol 315-a being available for communication by the control node 305-a (e.g., a hard resource type, which may correspond to an available resource 325-a), a second resource type associated with the symbol 315-a being unavailable for communication by the control node 305-a (e.g., a not available resource type, which may correspond to a not available resource 330-a), or a third resource type associated with the symbol 315-a being conditionally available for communication by the control node 305-a (e.g., a soft resource type, which may correspond to a conditionally available resource 335-a). The RB sets 320-a may be included within a component carrier (CC).

Similarly, relay node 310-a may be configured with a resource configuration. The resource configuration may include a time domain pattern associated with a set of symbols (e.g., symbols 315-a) and one or more RB sets 320-a. The time domain pattern may indicate, for each symbol 315-a of the set of symbols, a resource type of a set of resource types associated with availability of each symbol 315-a for communication by relay node 310-a with MT 213-g. For instance, a given symbol 315-a may be associated with a first resource type of the set of resource types that is associated with the symbol 315-a being available for communication by the relay node 310-a (e.g., a hard resource type), a second resource type associated with the symbol 315-a being unavailable for communication by the relay node 310-a (e.g., a not available resource type), or a third resource type associated with the symbol 315-a being conditionally available for communication by the relay node 310-a (e.g., a soft resource type). The RB sets 320-a may be included within a CC.

In some examples, control node 305-a (e.g., the DU 212-f of control node 305-a) may communicate with relay node 310-a (e.g., the MT 213-f of relay node 310-a) according to a resource configuration. The resource configuration may be associated with a respective RB) set and a respective time domain pattern. Each time domain pattern may indicate, for each symbol of a respective set of symbols associated with each time domain pattern, a resource type associated with availability of each symbol for communication by relay node 310-a.

In some examples, control node 305-a may transmit, to relay node 310-a (e.g., from the DU 212-f of control node 305-a to the MT 213-f of relay node 310-a), an indication of a resource configuration to configure the relay node 310-a with the resource configuration. To update the resource configuration, the control node 305-a may transmit an updated resource configuration to the relay node 310-a. However, transmitting the indication of the updated resource configuration to the relay node 310-a each time the resource configuration at relay node 310-a is to be updated may be associated with a latency above a threshold amount or an overhead above a threshold amount.

Control node 305-a may transmit an indication of a set of resource configurations for relay node 310-a. When the resource configuration at the relay node 310-a is to be updated, control node 305-a may transmit an indication to communicate according to one or more of the set of resource configurations (e.g., control node 305-a may transmit an indication to activate the one or more of the set of resource configurations). The indication to communicate according to the one or more of the set of resource configurations may be associated with a lower latency or a lower overhead than indicating an updated resource configuration each time the resource configuration of the relay node 310-a is to be communicated.

Figure 3B:
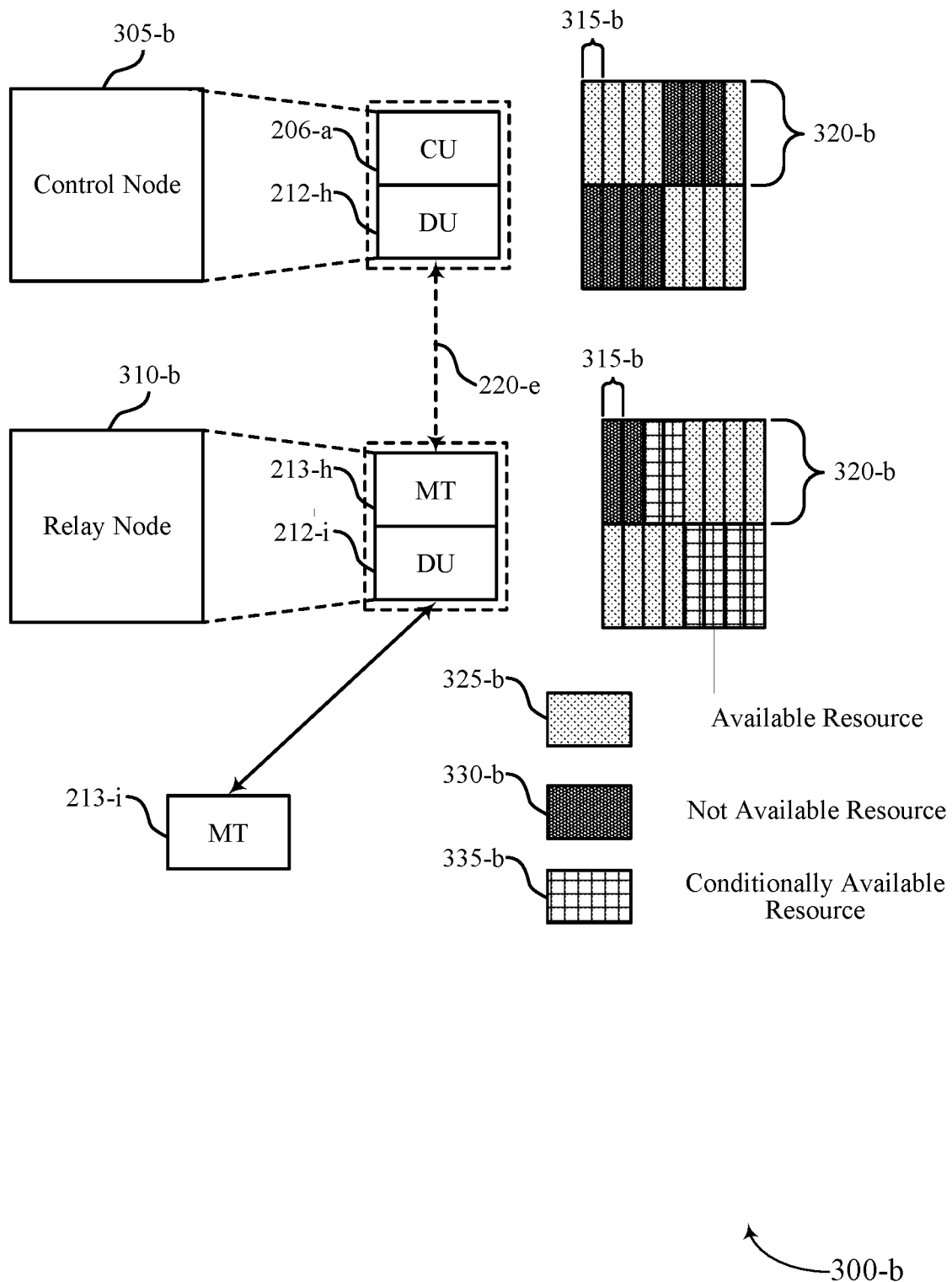

FIG. 3B illustrates an example of a resource configuration scheme 300-b that supports adaptive frequency domain resource configuration for a relay node in accordance with aspects of the present disclosure. In some examples, resource configuration scheme 300-b may implement one or more aspects of wireless communications systems 100 or 200 and/or resource configuration scheme 300-a. For instance, control node 305-b may be an example of a central control node 210 as described with reference to FIG. 2 and relay node 310-b may be an example of a relay node 215 as described with reference to FIG. 2 and/or a base station 105 as described with reference to FIG. 1. In some examples, CU 206-a may be an example of a CU 206 as described with reference to FIG. 2, MT 213-h and MT 213-i may each be an example of an MT 213 as described with reference to FIG. 2, and DU 212-h and 212-i may each be an example of a DU 212 as described with reference to FIG. 2. Additionally, or alternatively, MT 213-i may be an example of a UE 115 as described with reference to FIG. 1. In some examples, multi-hop communications may occur between control node 305-b and relay node 310-b. Control node 305-b may be connected directly to relay node 310-b via a communication link 220-e, or communication link 220-e may include one or more hops (e.g., other relay nodes 310) between control node 305-b and relay node 310-b.

Control node 305-b may include a CU 206-a and a DU 212-h and relay node 310-b may include an MT 213-h and a DU 212-i. Generally, the DU 212-h of the control node 305-b may be configured to communicate with the MT 213-h of the relay node 310-b and the DU 212-i of the relay node 310-b may be configured to communicate with an MT 213-i (e.g., a UE 115 or a relay node 215).

In some examples, control node 305-b may be configured with a resource configuration. The resource configuration may include a time domain pattern associated with a set of symbols (e.g., symbols 315-b) and one or more RB sets 320-b. The time domain pattern may indicate, for each symbol 315-b of the set of symbols, a resource type of a set of resource types associated with availability of each symbol 315-b for communication by control node 305-b with relay node 310-b. For instance, a given symbol 315-b may be associated with a first resource type of the set of resource types that is associated with the symbol 315-b being available for communication by the control node 305-b (e.g., a hard resource type), a second resource type associated with the symbol 315-*b* being unavailable for communication by the control node 305-*b* (e.g., a not available resource type), or a third resource type associated with the symbol 315-*b* being conditionally available for communication by the control node 305-*b* (e.g., a soft resource type). The RB sets 320-*b* may be included within a component carrier (CC).

Similarly, relay node 310-*b* may be configured with a resource configuration. The resource configuration may include a time domain pattern associated with a set of symbols (e.g., symbols 315) and one or more RB sets 320. The time domain pattern may indicate, for each symbol 315-*b* of the set of symbols, a resource type of a set of resource types associated with availability of each symbol 315-*b* for communication by relay node 310-*b* with MT 213-*i*. For instance, a given symbol 315-*b* may be associated with a first resource type of the set of resource types that is associated with the symbol 315-*b* being available for communication by the relay node 310-*b* (e.g., a hard resource type, which may correspond to an available resource 325-*b*), a second resource type associated with the symbol 315-*b* being unavailable for communication by the relay node 310-*b* (e.g., a not available resource type, which may correspond to a not available resource 330-*b*), or a third resource type associated with the symbol 315-*b* being conditionally available for communication by the relay node 310-*b* (e.g., a soft resource type, which may correspond to a conditionally available resource 335-*b*). The RB sets 320-*b* may be included within a CC.

In some examples, control node 305-*b* (e.g., the DU 212-*h* of control node 305-*b*) may communicate with relay node 310-*b* (e.g., the MT 213-*h* of relay node 310-*b*) according to a resource configuration. The resource configuration may be associated with a respective RB) set and a respective time domain pattern. Each time domain pattern may indicate, for each symbol of a respective set of symbols associated with each time domain pattern, a resource type associated with availability of each symbol for communication by relay node 310-*b*.

In some examples, control node 305-*b* may transmit, to relay node 310-*b* (e.g., from the DU 212-*h* of control node 305-*b* to the MT 213-*h* of relay node 310-*b*), an indication of a resource configuration to configure the relay node 310-*b* with the resource configuration. To update the resource configuration, the control node 305-*b* may transmit an updated resource configuration to the relay node 310-*b*. However, transmitting the indication of the updated resource configuration to the relay node 310-*b* each time the resource configuration at relay node 310-*b* is to be updated may be associated with a latency above a threshold amount or an overhead above a threshold amount.

Control node 305-*b* may transmit an indication of a set of resource configurations for relay node 310-*b*. When the resource configuration at the relay node 310-*b* is to be updated, control node 305-*b* may transmit an indication to communicate according to one or more of the set of resource configurations (e.g., control node 305-*b* may transmit an indication to activate the one or more of the set of resource configurations). The indication to communicate according to the one or more of the set of resource configurations may be associated with a lower latency or a lower overhead than indicating an updated resource configuration each time the resource configuration of the relay node 310-*b* is to be communicated.

In some examples, a symbol (e.g., a symbol 315-*a* or 315-*b*) of a not available resource type may be used to communicate cell-specific reference signals. In some examples, a symbol (e.g., a symbol 315-*a* or 315-*b*) of a soft resource type may be dynamically controlled by a parent node (e.g., the control node 305-*b* or a different relay node 310). For instance, the parent node may provide an explicit indication (e.g., downlink control information (DCI)) to the child node (e.g., relay node 310-*b*). Additionally, or alternatively, the relay node 310-*b* may determine implicitly that the MT 213 of the child node may not be impacted and perform communications over the symbol 315-*a* or 315-*b* accordingly. In some examples, an IAB resource management framework (e.g., including semi-static resource configuration and DCI for dynamic availability indication) may support frequency division multiplexing (FDM) in a granularity of a carrier (e.g., in terms of a DU cell).

In some examples, semi-static DU resource type indication may be supported for frequency-domain resources within a carrier for hard resource types, soft resource types, and not available resource types. In some such examples, granularity for frequency domain resources within a carrier may have a defined value (e.g., a starting point may be a set of N RBs with a value of N≥1). In case of coexistence between TDM and FDM operation, time-granularity of switching between multiplexing options may follow timing of carriers used for access links to ensure backwards compatibility with IAB nodes and to avoid impact on access UEs 115 and their RRC configurations at a CU 206. In a case that soft resources are supported in a frequency-domain extension, DCI may support dynamic indication of availability for soft frequency resources. For instance, separate indication of time and frequency resources may be supported (e.g., via different fields, different radio network temporary identifiers (RNTIs), or different DCI) or joint indication of time and frequency resources may be supported. In some examples, FDM may be extended across carriers and limitations may be employed on a minimum bandwidth or band for FDM operation (e.g., FR2, ≥100 MHz).

In some examples, a BWP may include a group of contiguous physical RBs (PRBs) within a carrier. A UE 115 may be configured with one or more downlink BWPs and one or more uplink BWPs per serving cell via a dedicated RRC configuration. Before RRC configuration occurs, the UE 115 may use an initial downlink and/or uplink BWP, which may be broadcast in a system information block (SIB), such as SIB1. In some examples, there may be at most one active downlink BWP and at most one active uplink BWP at a given time for a serving cell. A UE 115 may receive and/or transmit within active downlink and/or uplink BWPs using the associated numerology. In some examples, BWP switching may be supported via an RRC-reconfiguration based BWP switch. For instance, BWP switching from an initial BWP to a first active BWP may occur via RRC reconfiguration for a primary cell (PCell) or special cell (SPcell) and/or upon activation of a secondary cell (SCell). The first active downlink and/or uplink BWP may be configured upon an SCell addition, upon a PCell change in a master cell group (MCG), and a primary SCell (PSCell) addition or change in a secondary cell group (SCG). Additionally, or alternatively, BWP switching may be supported via a DCI-based BWP switch (e.g., via a BWP indicator field in the DCI) or a timer-based BWP switch. For instance, upon expiration of a BWP inactivity timer (e.g., due to no reception of DCI), an active BWP may switch a default BWP configured by RRC.

In some examples, frequency-domain resource management within a cell may be supported via a BWP for a DU cell. For instance, a separate time-domain resource management (e.g., for hard resource type, soft resource type, not available resource type) may be applied per BWP of a DU cell. For instance, an IAB resource management framework from a per DU cell to a per UR RB set may be employed, where a DU RB set may be configured by a CU as a set of consecutive RBs within a DU cell. Additionally, or alternatively, an existing time domain resource configuration (e.g., for a hard resource type, soft resource type, not available resource type) and a second configuration across BWPs with each BWP may be indicated with a type value. An RB set may be associated with a granularity in a frequency-domain used for a resource configuration, which may, in some examples, be distinct from a BWP.

Figure 4:
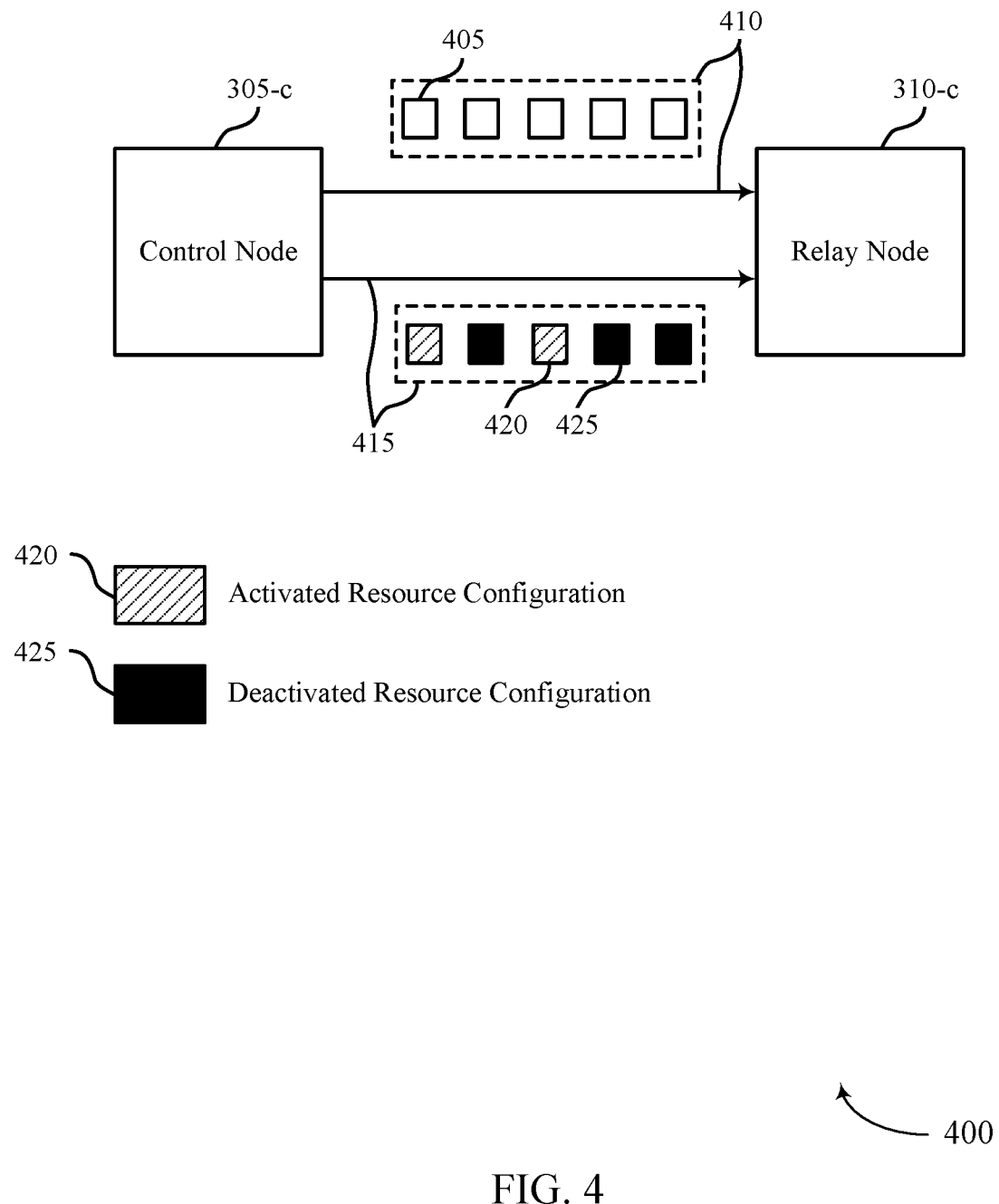
FIG. 4 illustrates an example of a wireless communications system that supports adaptive frequency domain resource configuration for a relay node in accordance with aspects of the present disclosure.

FIG. 4 illustrates an example of a wireless communications system 400 that supports adaptive frequency domain resource configuration for a relay node in accordance with aspects of the present disclosure. In some examples, wireless communications system 400 may be implemented by one or more aspects of wireless communications system 100, node configuration scheme 200, and/or resource configuration schemes 300-a or 300-b. For instance, control node 305-c may be an example of a control node 305-b as described with reference to FIG. 3B, a control node 305-a as described with reference to FIG. 3A, a central control node 210 or relay node 215 as described with reference to FIG. 2, a base station 105 as described with reference to FIG. 1, an IAB node, or an IAB donor-CU node. Relay node 310-c may be an example of a relay node 310-b as described with reference to FIG. 3B, a relay node 310-a as described with reference to FIG. 3A, a relay node 215 as described with reference to FIG. 2, a base station 105 as described with reference to FIG. 1, or an IAB node.

In some examples control node 305-c may transmit, to relay node 310-c, an indication 410 of a set of resource configurations (e.g., resource configurations 405) for relay node 310-c. Each resource configuration of the set of resource configurations may be associated with a respective RB set (e.g., RB set 320-a or 320-b) and a respective time domain pattern. Each time domain pattern may indicate, for each symbol (e.g., symbol 315-a or 315-b) of a set of symbols associated with the time domain pattern, a resource type associated with availability of each symbol for communication by relay node 310-c with a second relay node (e.g., a child node of relay node 310-c). In some examples, control node 305-c may receive the indication 410 from a parent node of control node 305-c or a central control node.

In some examples, control node 305-c may transmit, to relay node 310-c, an indication 415 to communicate according to one or more resource configurations 405 of the set of resource configurations. For instance, control node 305-c may indicate that relay node 310-c is to communicate according to a first subset of the set of resource configurations that corresponds to activated resource configurations 420 and to refrain from communicating according to a second subset of the set of resource configurations that corresponds to deactivated resource configurations 425. If relay node 310-c is communicating according to a resource configuration before receiving the indication 415 and the indication 415 indicates that the resource configuration is a deactivated resource configuration 425, relay node 310-c may cease communicating according to the resource configuration. Conversely, if relay node 310-c is refraining from communicating according to a resource configuration before receiving the indication 415 and the indication 415 indicates that the resource configuration is an activated resource configuration 420, relay node 310-c may begin communicating according to the resource configuration. In some examples, the indication may be provided via DCI signaling or MAC control element (MAC-CE) signaling (e.g., if control node 305-c is a parent relay node of relay node 310-c, such as relay node 215-a described with reference to FIG. 2) or may be provided via radio resource control (RRC) signaling or F1 application protocol (F1-AP) signaling (e.g., if control node 305-c is a central control node, such as a central control node 210 described with reference to FIG. 2).

In some examples, the indication 415 may indicate just activated resource configurations 420 or just deactivated resource configurations 425. In the former case, the relay node 310-c may determine to refrain from or to cease communicating according to each resource configuration of the set of resource configurations that is not indicated by indication 415 to be an activated resource configuration 420. In the latter case, the relay node 310-c may determine to communicate or to begin communicating according to each resource configuration of the set of resource configurations that is not indicated by the indication 415 to be a deactivated resource configuration 425.

In some examples, the relay node 310-c may initially be communicating according to a first resource configuration and the indication 415 may indicate that the relay node 310-b is to communicate according to a second resource configuration (e.g., the second resource configuration is an activated resource configuration 420). In some such examples, the relay node 310-c may cease communicating according to the first resource configuration and may begin communicating according to the second resource configuration (e.g., regardless of whether first resource configuration was explicitly indicated as a deactivated resource configuration 425).

In some examples, relay node 310-c may transmit, to control node 305-c, a request to communicate according to a resource configuration. In some such examples, the indication 415 may indicate the resource configuration as an activated resource configuration 420 and relay node 310-c may communicate according to the resource configuration after receiving the indication 415. Additionally, or alternatively, relay node 310-c may transmit, to control node 305-c, a request to cease communicating according to a resource configuration. In some such examples, the indication 415 may indicate the resource configuration as a deactivated resource configuration 425 and relay node 310-c may cease communicating according to the resource configuration after receiving the indication 415.

In some examples, relay node 310-c may set, based on receiving the indication 415, a timer for one or more activated resource configurations 420 indicated by the indication 415. Once the timer stops running, relay node 310-c may cease communicating according to the one or more activated resource configurations 420 indicated by the indication 415. In some examples, the timer may be reset based on one or more criteria. For instance, if traffic received using an activated resource configuration 420 satisfies (e.g., exceeds, or matches or exceeds) a threshold, the timer may be reset such that the timer takes a longer time to stop than if the timer is not reset.

In some examples, relay node 310-c may determine a default resource type for resources excluded from each resource configuration of the set of resource configurations (e.g., indicated by indication 410). Additionally, or alternatively, relay node 310-c may determine a default resource type for resources of resource configurations that are not explicitly indicated as activated resource configurations 420.

In some examples, the indication 415 may include an indication of one or more criteria for communicating according to a resource configuration 405 (e.g., or for ceasing communicating according to a resource configuration 405).

For instance, the indication of the one or more criteria may enable relay node 310-c to determine whether a resource configuration 405 is an activated resource configuration 420 or a deactivated resource configuration 425 according to whether the one or more criteria are satisfied. The one or more criteria may include a detection of a collision between a resource configuration and another transmission, an interference metric being above a threshold amount, or both. Additionally, or alternatively, the one or more criteria may include ultra-reliable low-latency communication (URLLC) traffic for communicating. Additionally, or alternatively, the one or more criteria may include a detection of entering a location or zone, a speed associated with relay node 310-c, or both.

In some examples, a first set of symbols (e.g., symbols 315-a or 315-b) associated with a first activated resource configuration 420 may at least partially overlap with a second set of symbols (e.g., symbols 315-a or 315-b) associated with a second activated resource configuration 420 in time, frequency, or both. Alternatively, the first set of symbols may be non-overlapping with the second set of symbols.

In some examples, a first RB set associated with a first resource configuration 405 of the set of resource configurations may be non-overlapping in frequency with a second RB set associated with a second resource configuration 405 of the set of resource configurations. Additionally, or alternatively, the first RB set may partially overlap in frequency with the second RB set. In some examples, a size of the first RB set may be the same or may be different from a size of the second RB set. In some examples, a first time domain pattern associated with a first resource configuration 405 of the set of resource configurations may be different from or the same as a second time domain pattern associated with a second resource configuration 405 of the set of resource configurations.

In some examples, the activated resource configurations 420 may include each uplink resource configuration and the deactivated resource configurations 425 may include each downlink resource configuration. Conversely, the activated resource configurations 420 may include each downlink resource configuration and the deactivated resource configurations 425 may include each uplink resource configuration.

In some examples, a set of resource configurations 405, each confined within a specific RB set (e.g., where an RB set may be a number of consecutive RBs) may be indicated by a CU to an IAB-node DU per DU cell, where a subset of resource configurations may be activated or deactivated according to one or more options. For instance, in a first option, a donor CU may perform the activation or deactivation via F1-AP signaling or an RRC message. In a second option, a parent node may use a Uu interface to perform the activating or deactivating (e.g., using a MAC-CE or DCI from a parent DU to an IAB-MT). In some such examples, an additional uplink message from a child node to a parent node (e.g., via MAC-CE or uplink control information (UCI) over a physical uplink control channel (PUCCH) or a physical uplink shared channel (PUSCH)) may be supported for local coordination. In a third option, activation or deactivation may occur autonomously by a DU given some criteria (e.g., where the criteria may be configured or indicated by a donor CU or parent). For instance, one criteria may be associated with detection of a collision or high interference, acquiring information about the allocated resources associated with other network nodes, or an RB group (e.g., a BWP) being deactivated or activated. Another criteria may be associated with the presence of incoming URLLC traffic (e.g., or another critical traffic type). Another criteria may be associated with activation or deactivation being location or speed-specific. For instance, if a mobile IAB enters a zone, the mobile IAB may deactivate one or more resource configurations (e.g., associated with one or more RB groups).

In some examples, the RB sets between different resource configurations may be partially overlapping or non-overlapping, and the size of RB sets for different resource configurations may be the same or different. For a resource configuration confined within a given RB set, the resource pattern of one or more resource types (e.g., hard resource type, soft resource type, not available resource type) in the time domain may be configured such that different resource configurations have separate time domain patterns or such that different resource configurations share the same time-domain patterns. In some cases, an additional attribute may be associated with each resource configuration, which may enable one or more interpretations on a time-domain resource type (e.g., hard resource type, soft resource type, not available resource type) for a resource configuration.

In some examples, the activation of a resource configuration may be applied to each or a subset of resources configured by a resource configuration. For instance, a resource configuration may include one or more following states: deactivated, activated, or partially activated (e.g., activated for a subset of resources and deactivated for remaining resources). A default resources type may be predefined or configured by a CU for each resource that is not activated or not included by a resource configuration. For instance, the default resource type may be a not available resource type. In some cases, one configuration (e.g., only one configuration) with a configured set may be activated. In some examples, more than one configuration may be activated and/or partially activated, where the activated resources may be non-overlapping or overlapping with a configuration (e.g., a consistent configuration). For instance, a first configuration within a first RB set may be activated (e.g., partially activated) for each even slot, whereas a second configuration within a second RB set may be activated (e.g., partially activated) for each odd slot. In some such examples, the first RB set and the second RB set may be overlapping or non-overlapping in the frequency domain. Additionally, or alternatively, a first configuration with a first RB set may be activated for each slot and a second configuration with a second RB set may be activated for each slot, where the first RB set and the second RB set are non-overlapping in the frequency domain. In some cases, a transition time may be defined for switching from one resource configuration in a first set of resources to another resource configuration in a second set of resources.

An IAB node (e.g., with an MT and DU) may request (e.g., suggest) a CU to activate or deactivate a subset of its resource configurations. The activation or deactivation may be downlink or uplink specific. A timer may be associated with activation and/or deactivation. A status (e.g., activated, deactivated, partially activated, timer value) may be shared among different entities (e.g., from a DU to a CU, a parent-DU to an MT or UE, and MT to a parent-DU, a CU to a child-DU or child-MT, a CU to a CU (e.g., for DUs), or broadcast over the air).

In some examples, the methods described herein may be beneficial in one or more scenarios. For instance, in a dynamic topology (e.g., if relay node 310-c is a mobile IAB), instead of modifying a frequency domain resource configuration, a CU may per-configure a set of frequency domain resource configurations. The CU may activate and/ or deactivate a subset of configurations as requested and a set of parent and child IAB nodes may coordinate locally with no or minimum (e.g., below a threshold amount of) CU involvement to determine a configuration. Additionally, or alternatively, the methods described herein may be beneficial for when bursty URLLC traffic (e.g., URLLC traffic with a density or quantity above a threshold) is present over a multi-hop IAB network. In some such examples, quickly adapting a frequency domain (FD) resource configuration (e.g., adapting the FD resource configuration within a threshold time), such as according to the methods described herein, may ensure that a sufficient amount of resources (e.g., above a threshold number) are available in time at any given hop. Additionally, or alternatively, the methods described herein may support inter-CU dual-connected IAB nodes (e.g., two parent nodes managed by different donor CUs). For instance, instead of using an inter-CU coordination via an Xn interface, the IAB node may coordinate locally with two parent nodes to adapt an FD resource configuration for avoiding or reducing (e.g., minimizing) interference.

In some examples, a control node 305-$c$ and a relay node 310-$c$ using the methods described herein may have one or more advantages. For instance, by transmitting the indication of activated resource configurations 420 and/or deactivated resource configurations 425, the control node 305-$c$ and/or relay node 310-$c$ may experience one or more of reduced latency, signaling overhead, or power consumption as compared to transmitting an updated resource configuration each time relay node 310-$c$ or control node 305-$c$ is to update a resource configuration of relay node 310-$c$.

Figure 5:
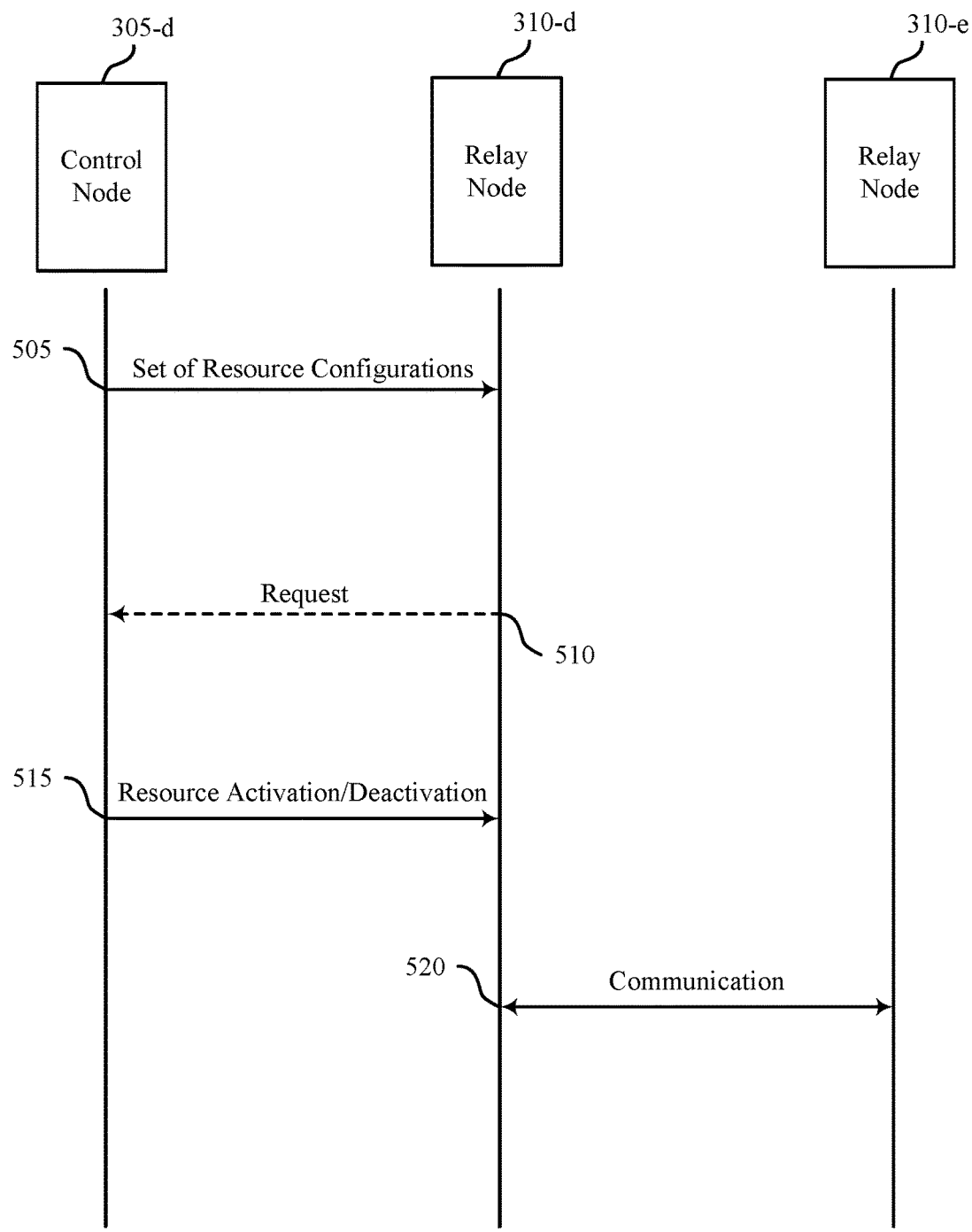
FIG. 5 illustrates an example of a process flow that supports adaptive frequency domain resource configuration for a relay node in accordance with aspects of the present disclosure.

FIG. 5 illustrates an example of a process flow 500 that supports adaptive frequency domain resource configuration for a relay node in accordance with aspects of the present disclosure. In some examples, process flow 500 may be implemented by one or more aspects of wireless communications system 100, node configuration scheme 200, resource configuration schemes 300-$a$ or 300-$b$, and/or wireless communications system 100. For instance, control node 305-$d$ may be an example of a control node 305-$c$ as described with reference to FIG. 4, a control node 305-$b$ as described with reference to FIG. 3B, a control node 305-$a$ as described with reference to FIG. 3A, a central control node 210 or relay node 215 as described with reference to FIG. 2, or a base station 105 as described with reference to FIG. 1. Relay nodes 310-$d$ and 310-$e$ may each be an example of a relay node 310-$c$ as described with reference to FIG. 4, a relay node 310-$b$ as described with reference to FIG. 3B, a relay node 310-$a$ as described with reference to FIG. 3A, a relay node 215 as described with reference to FIG. 2, or a base station 105 as described with reference to FIG. 1.

At 505, control node 305-$d$ may transmit, to relay node 310-$d$, an indication of a set of resource configurations for the first relay node. Each resource configuration of the set of resource configurations may be associated with a respective RB set and a respective time domain pattern. Each time domain pattern may indicate, for each symbol of a respective set of symbols associated with each time domain pattern, a resource type associated with availability of each symbol for communication by the first relay node with a second relay node. In some examples, the resource type may correspond to one of a set of resource types including a first resource type associated with a symbol being available for communication by the first relay node, a second resource type associated with the symbol being unavailable for communication by the first relay node, and a third resource type associated with the symbol being conditionally available for communication by the first relay node. In some examples, control node 305-$d$ may receive the indication of the set of resource configurations for relay node 310-$d$ from a parent node of control node 305-$d$ or a central control node. A controller of control node 305-$d$ and/or a controller of relay node 310-$d$ may perform the methods at 505.

At 510, relay node 310-$d$ may transmit, to control node 305-$d$, a request to communicate according to the first resource configuration. Additionally, or alternatively, relay node 310-$d$ may transmit, to control node 305-$d$, a request to cease communicating according to the first resource configuration. A controller of control node 305-$d$ and/or a controller of relay node 310-$d$ may perform the methods at 510.

At 515, control node 305-$d$ may transmit, to relay node 310-$d$ an indication to communicate according to a first resource configuration of the set of resource configurations (e.g., to activate the first resource configuration). In some examples, control node 305-$d$ may transmit, to relay node 310-$d$, an indication to communicate according to a second resource configuration of the set of resource configurations. In some examples, receiving the indication to communicate according to the first resource configuration and the indication to communication according to the second resource configuration may include receiving, from control node 305-$d$ and at relay node 310-$d$, an indication to communicate according to a subset of the set of resource configurations, where the subset of the set of resource configurations includes the first resource configuration and the second resource configuration. In some examples, the subset of the set of resource configurations may exclude at least one resource configuration of the set of resource configurations. In some examples, the subset of the set of resource configurations may include each resource configuration of the set of resource configurations that is an uplink resource configuration or each resource configuration of the set of resource configurations that is a downlink resource configuration. In some examples, a first set of symbols associated with the first resource configuration at least partially overlaps with or may be non-overlapping with a second set of symbols associated with the second resource configuration in time, frequency, or both. In some examples, relay node 310-$d$ may receive the request to communicate according to the second resource configuration after receiving the indication to communicate according to the first resource configuration. In some examples, receiving the indication to communicate according to the first resource configuration may be received based on communicating the request (e.g., at 310).

Additionally, or alternatively, at 515, control node 305-$d$ may transmit, to relay node 310-$d$, an indication to cease communicating according to the first resource configuration. In some examples, control node 305-$d$ may transit, to relay node 310-$d$, an indication to cease communicating according to a subset of the set of resource configurations, where the subset of the set of resource configurations may include the first resource configuration. In some examples, the subset of the set of resource configurations may exclude at least one resource configuration of the set of resource configurations. In some examples, receiving the indication to cease communicating according to the first resource configuration may be based on communicating the request (e.g., at 510). In some examples, control node 305-$d$ may receive the indication to communicate according to the first resource configuration or to cease communicating according to the first resource configuration from a parent node of control node 305-*d* or a central control node. A controller of control node 305-*d* and/or a controller of relay node 310-*d* may perform the methods at 515.

At 520, relay node 310-*d* may communicate (e.g., with relay node 310-*e*) according to the first resource configuration based on receiving the indication to communicate according to the first resource configuration. In some examples, relay node 310-*d* may communicate according to the second resource configuration based on receiving the indication to communicate according to the second resource configuration. In some examples, relay node 310-*d* may refrain from communicating (e.g., with relay node 310-*e*) according to the at least one resource configuration based on the subset of the set of resource configurations excluding the at least one resource configuration. In some examples, relay node 310-*d* may cease communicating according to the first resource configuration based on receiving the indication to communicate according to the second resource configuration. In some examples, relay node 310-*d* may communicate according to the second resource configuration based on receiving the indication to communicate according to the second resource configuration. In some examples, relay node 310-*d* may communicate according to the at least one resource configuration of the set of resource configurations based on the subset of the set of resource configurations excluding the at least one resource configuration. A controller of control node 305-*d* and/or a controller of relay node 310-*d* may perform the methods at 520.

In some examples, relay node 310-*d* may set, based on receiving the indication to communicate according to the first resource configuration, a timer, where communicating according to the first resource configuration may occur while the timer is running. In some examples, relay node 310-*d* may cease communicating (e.g., with relay node 310-*e*) according to the first resource configuration based on the timer stopping. In some examples, relay node 310-*d* may reset the timer while the timer is running based on one or more criteria.

In some examples, relay node 310-*d* may determine a default resource type for the at least one resource configuration of the set of resource configurations. In some examples, relay node 310-*d* may determine a default resource type for a set of resources excluded from each resource configuration of the set of resource configurations.

In some examples, the indication to communicate is provided via RRC signaling, MAC-CE signaling, DCI signaling, F1AP signaling, or a combination thereof. In some examples, the indication to communicate includes an indication of one or more criteria for communicating according to the first resource configuration, and communicating according to the first resource configuration is based at least in part on whether the one or more criteria are satisfied. In some examples, the one or more criteria includes a detection of a collision between a transmission associated with the first resource configuration and another transmission, an interference metric being above a threshold amount, or both. In some examples, the one or more criteria includes ultra-reliable low-latency communication traffic for the communicating. In some examples, the one or more criteria includes a detection of entering a location or zone, a speed associated with the first relay node satisfying a threshold, or both.

In some examples, a first RB set associated with the first resource configuration at least partially overlaps in time, frequency, or both with a second RB set associated with a second resource configuration of the set of resource configurations. In some examples, a first RB set associated with the first resource configuration is non-overlapping in time and frequency with a second RB set associated with a second resource configuration of the set of resource configurations. In some examples, a first size of a first RB set associated with the first resource configuration is the same as a second size of a second RB set associated with a second resource configuration of the set of resource configurations. In some examples, a first size of a first RB set associated with the first resource configuration is different from a second size of a second RB set associated with a second resource configuration of the set of resource configurations. In some examples, a first time domain pattern associated with the first resource configuration is different from a second time domain pattern associated with a second resource configuration of the set of resource configurations. In some examples, wherein a first time domain pattern associated with the first resource configuration is the same as a second time domain pattern associated with a second resource configuration of the set of resource configurations.

In some examples, the second relay node is a child node of the first relay node. In some examples, the control node includes a central control node or a parent node of the first relay node. In some examples, the central control node includes an IAB donor CU. In some examples, the first relay node includes an IAB node.

Figure 6:
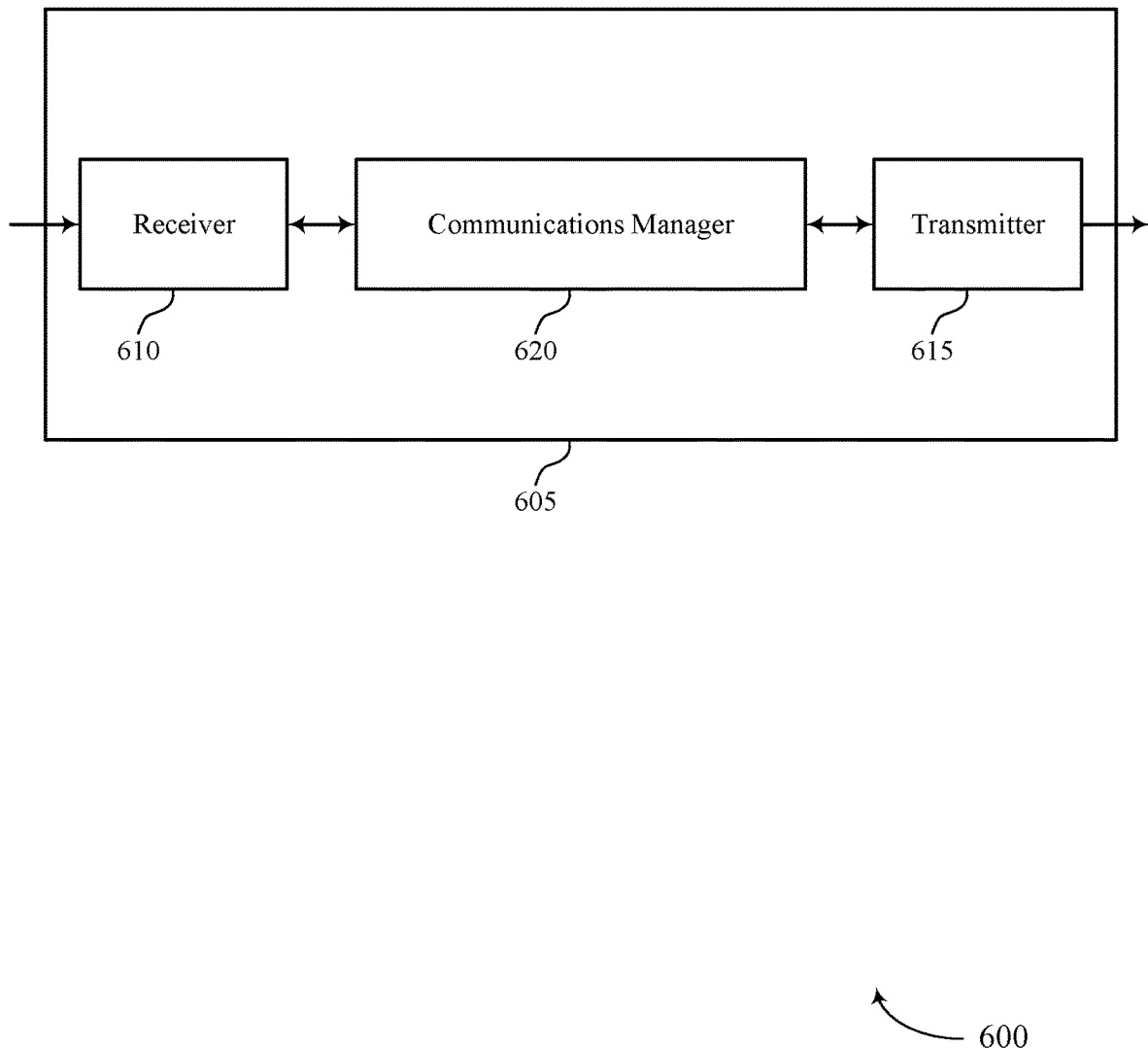
FIGS. 6 and 7 show block diagrams of devices that supports adaptive frequency domain resource configuration for a relay node in accordance with aspects of the present disclosure.

FIG. 6 shows a block diagram 600 of a device 605 that supports adaptive frequency domain resource configuration for a relay node in accordance with aspects of the present disclosure. The device 605 may be an example of aspects of a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to supporting adaptive frequency domain resource configuration for a relay node). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to supporting adaptive frequency domain resource configuration for a relay node). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of supporting adaptive frequency domain resource configuration for a relay node as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first relay node in accordance with examples as disclosed herein. For example, the communications manager 620 may be configured as or otherwise support a means for receiving, from a control node, an indication to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. The communications manager 620 may be configured as or otherwise support a means for communicating according to the first resource configuration based on receiving the indication to communicate according to the first resource configuration.

Additionally, or alternatively, the communications manager 620 may support wireless communication at a control node in accordance with examples as disclosed herein. For example, the communications manager 620 may be configured as or otherwise support a means for transmitting, to a first relay node, an indication of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. The communications manager 620 may be configured as or otherwise support a means for transmitting, to the first relay node, an indication to communicate according to a first resource configuration of the set of resource configurations.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for the device 605 to experience reduced latency, signaling overhead, or power consumption as compared to transmitting an updated resource configuration each time the device 605 or a child node of the device 605 is to update a resource configuration of the device 605 or the child node of the device 605, respectively.

Figure 7:
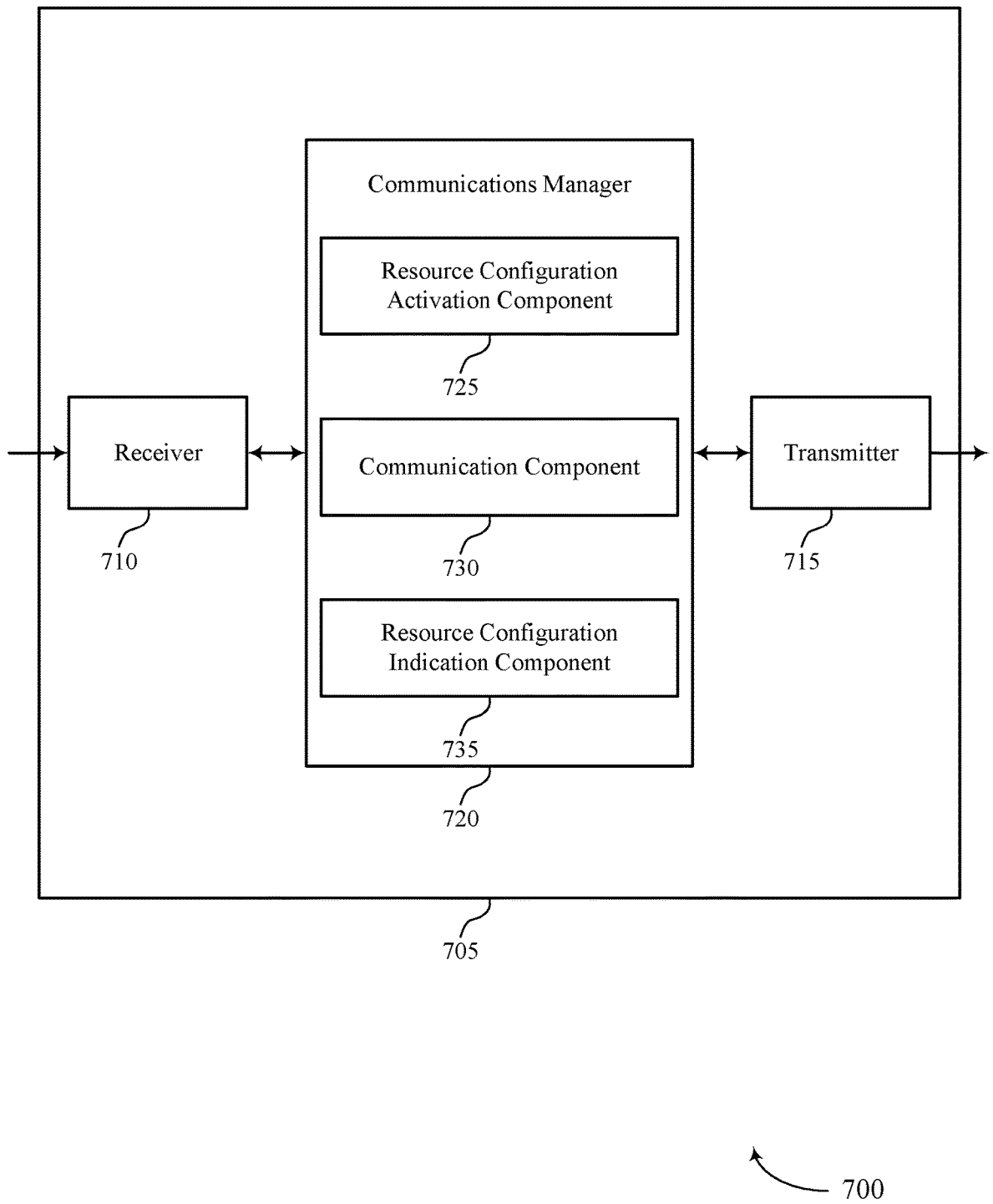

FIG. 7 shows a block diagram 700 of a device 705 that supports adaptive frequency domain resource configuration for a relay node in accordance with aspects of the present disclosure. The device 705 may be an example of aspects of a device 605 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to supporting adaptive frequency domain resource configuration for a relay node). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to supporting adaptive frequency domain resource configuration for a relay node). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of supporting adaptive frequency domain resource configuration for a relay node as described herein. For example, the communications manager 720 may include a resource configuration activation component 725, a communication component 730, a resource configuration indication component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first relay node in accordance with examples as disclosed herein. The resource configuration activation component 725 may be configured as or otherwise support a means for receiving, from a control node, an indication to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. The communication component 730 may be configured as or otherwise support a means for communicating according to the first resource configuration based on receiving the indication to communicate according to the first resource configuration.

Additionally, or alternatively, the communications manager 720 may support wireless communication at a control node in accordance with examples as disclosed herein. The resource configuration indication component 735 may be configured as or otherwise support a means for transmitting, to a first relay node, an indication of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. The resource configuration activation component 725 may be configured as or otherwise support a means for transmitting, to the first relay node, an indication to communicate according to a first resource configuration of the set of resource configurations.

Figure 8:
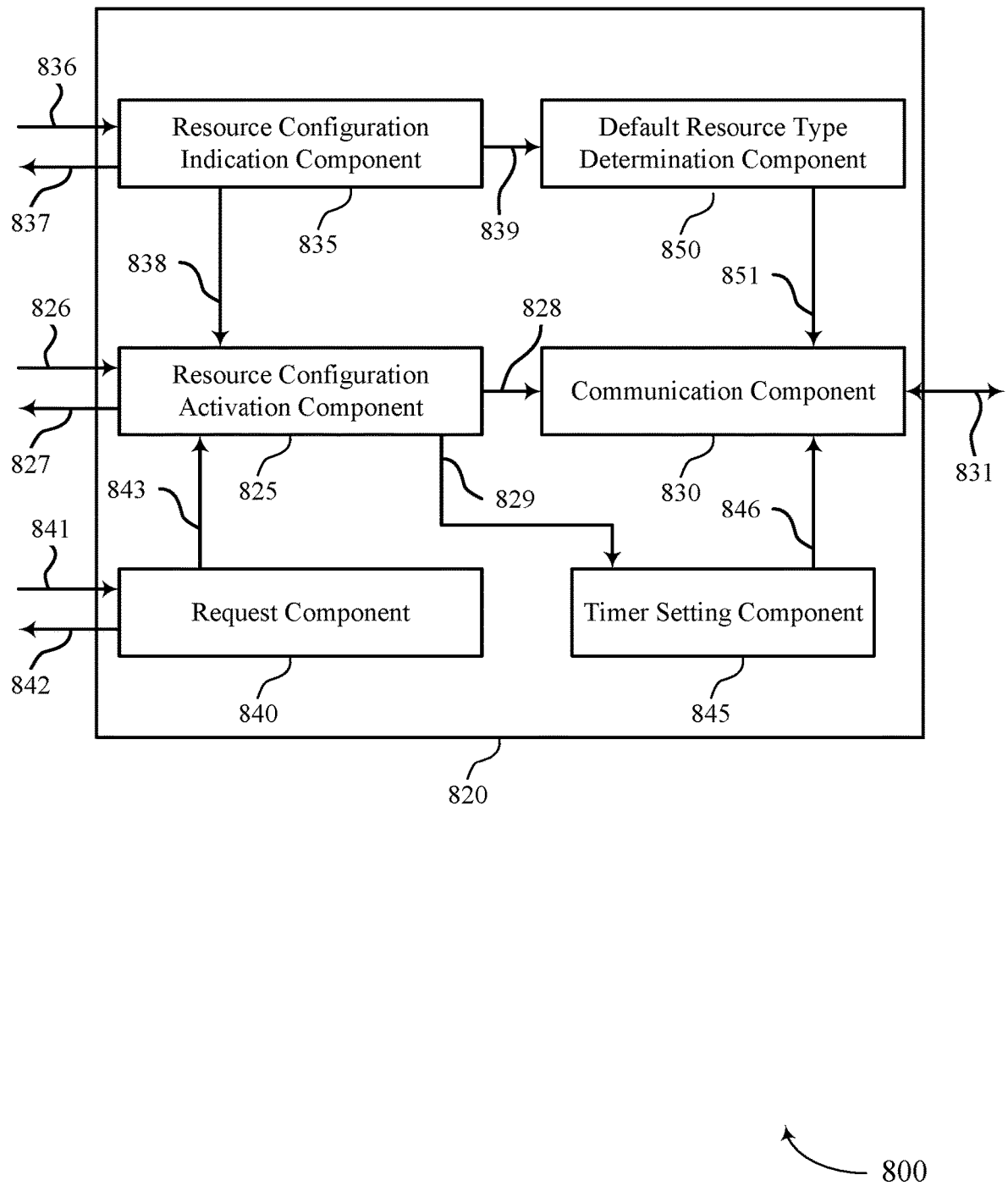
FIG. 8 shows a block diagram of a communications manager that supports adaptive frequency domain resource configuration for a relay node in accordance with aspects of the present disclosure.

FIG. 8 shows a block diagram 800 of a communications manager 820 that supports adaptive frequency domain resource configuration for a relay node in accordance with aspects of the present disclosure. The communications manager 820 may be an example of aspects of a communications manager 620, a communications manager 720, or both, as described herein. The communications manager 820, or various components thereof, may be an example of means for performing various aspects of supporting adaptive frequency domain resource configuration for a relay node as described herein. For example, the communications manager 820 may include a resource configuration activation component 825, a communication component 830, a resource configuration indication component 835, a request component 840, a timer setting component 845, a default resource type determination component 850, or any combination thereof. Each of these components may communicate, directly or indirectly, with one another (e.g., via one or more buses).

The communications manager 820 may support wireless communication at a first relay node in accordance with examples as disclosed herein. The resource configuration activation component 825 may be configured as or otherwise support a means for receiving, from a control node, an indication 826 to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. The communication component 830 may be configured as or otherwise support a means for communicating according to the first resource configuration based on receiving the indication to communicate according to the first resource configuration. In some examples, resource configuration activation component 825 may transmit, to communication component 830, an indication 828 to communicate according to the first resource configuration. In some examples, communication component 830 may communicate a transmission 831.

In some examples, the resource configuration activation component 825 may be configured as or otherwise support a means for receiving, from the control node, an indication to communicate according to a second resource configuration of the set of resource configurations. In some examples, the communication component 830 may be configured as or otherwise support a means for communicating according to the second resource configuration based on receiving the indication to communicate according to the second resource configuration.

In some examples, to support receiving the indication to communicate according to the first resource configuration and the indication to communicate according to the second resource configuration, the resource configuration activation component 825 may be configured as or otherwise support a means for receiving, from the control node, an indication to communicate according to a subset of the set of resource configurations, where the subset includes the first resource configuration and the second resource configuration.

In some examples, the subset of the set of resource configurations excludes at least one resource configuration of the set of resource configurations.

In some examples, the resource configuration activation component 825 may be configured as or otherwise support a means for refraining from communicating according to the at least one resource configuration based on the subset of the set of resource configurations excluding the at least one resource configuration.

In some examples, the default resource type determination component 850 may be configured as or otherwise support a means for determining a default resource type for the at least one resource configuration of the set of resource configurations. In some examples, resource configuration indication component 835 may transmit, to default resource type determination component 850, an indication 839 of the set of resource configurations. Additionally, default resource type determination component 850 may transmit, to communication component 830, an indication 851 of the determined default resource type.

In some examples, the subset of the set of resource configurations includes each resource configuration of the set of resource configurations that is an uplink resource configuration or each resource configuration of the set of resource configurations that is a downlink resource configuration.

In some examples, a first set of symbols associated with the first resource configuration at least partially overlaps with a second set of symbols associated with the second resource configuration in time, frequency, or both.

In some examples, a first set of symbols associated with the first resource configuration is non-overlapping with a second set of symbols associated with the second resource configuration in time, frequency, or both.

In some examples, the resource configuration activation component 825 may be configured as or otherwise support a means for receiving, from the control node, an indication to communicate according to a second resource configuration of the set of resource configurations after receiving the indication to communicate according to the first resource configuration. In some examples, the resource configuration activation component 825 may be configured as or otherwise support a means for ceasing communicating according to the first resource configuration based on receiving the indication to communicate according to the second resource configuration. In some examples, the communication component 830 may be configured as or otherwise support a means for communicating according to the second resource configuration based on receiving the indication to communicate according to the second resource configuration.

In some examples, the request component 840 may be configured as or otherwise support a means for transmitting, to the control node, a request 842 to communicate according to the first resource configuration, where the indication to communicate according to the first resource configuration is received based on transmitting the request. In some examples, request component 840 may transmit an indication 843 of the request to resource configuration activation component 825.

In some examples, the resource configuration activation component 825 may be configured as or otherwise support a means for receiving, from the control node, an indication to cease communicating according to the first resource configuration.

In some examples, the request component 840 may be configured as or otherwise support a means for transmitting, to the control node, a request to cease communicating according to the first resource configuration, where receiving the indication to cease communicating according to the first resource configuration is based on transmitting the request.

In some examples, to support receiving the indication to cease communicating according to the first resource configuration, the resource configuration activation component 825 may be configured as or otherwise support a means for receiving, from the control node, an indication to cease communicating according to a subset of the set of resource configurations, where the subset of the set of resource configurations includes the first resource configuration.

In some examples, the subset of the set of resource configurations excludes at least one resource configuration of the set of resource configurations.

In some examples, the communication component 830 may be configured as or otherwise support a means for communicating according to the at least one resource configuration of the set of resource configurations based on the subset of the set of resource configurations excluding the at least one resource configuration.

In some examples, the timer setting component 845 may be configured as or otherwise support a means for setting, based on receiving the indication to communicate according to the first resource configuration, a timer, where communicating according to the first resource configuration occurs while the timer is running. In some examples, resource configuration activation component 825 may transmit an indication 829 of the first resource configuration to timer setting component 845. In some examples, timer setting component 845 may transmit an indication 846 of the timer being set to communication component 830.

In some examples, the communication component 830 may be configured as or otherwise support a means for ceasing communicating according to the first resource configuration based on the timer stopping.

In some examples, the timer setting component 845 may be configured as or otherwise support a means for resetting the timer while the timer is running based on one or more criteria.

In some examples, the default resource type determination component 850 may be configured as or otherwise support a means for determining a default resource type for a set of resources excluded from each resource configuration of the set of resource configurations.

In some examples, the indication to communicate is provided via radio resource control signaling, medium access control (MAC) control element signaling, downlink control information signaling, F1 application protocol (FLAP) signaling, or a combination thereof.

In some examples, the indication to communicate includes an indication of one or more criteria for communicating according to the first resource configuration. In some examples, communicating according to the first resource configuration is based on whether the one or more criteria are satisfied.

In some examples, the one or more criteria includes a detection of a collision between a transmission associated with the first resource configuration and another transmission, an interference metric being above a threshold amount, or both.

In some examples, the one or more criteria includes ultra-reliable low-latency communication traffic for the communicating.

In some examples, the one or more criteria includes a detection of entering a location or zone, a speed associated with the first relay node satisfying a threshold, or both.

In some examples, a first resource block set associated with the first resource configuration at least partially overlaps in time, frequency, or both with a second resource block set associated with a second resource configuration of the set of resource configurations.

In some examples, a first resource block set associated with the first resource configuration is non-overlapping in time and frequency with a second resource block set associated with a second resource configuration of the set of resource configurations.

In some examples, a first size of a first resource block set associated with the first resource configuration is the same as a second size of a second resource block set associated with a second resource configuration of the set of resource configurations.

In some examples, a first size of a first resource block set associated with the first resource configuration is different from a second size of a second resource block set associated with a second resource configuration of the set of resource configurations.

In some examples, a first time domain pattern associated with the first resource configuration is different from a second time domain pattern associated with a second resource configuration of the set of resource configurations.

In some examples, a first time domain pattern associated with the first resource configuration is the same as a second time domain pattern associated with a second resource configuration of the set of resource configurations.

In some examples, the second relay node is a child node of the first relay node.

In some examples, the control node includes a central control node or a parent node of the first relay node.

In some examples, the central control node includes an integrated access and backhaul donor central unit.

In some examples, the first relay node includes an integrated access and backhaul node.

In some examples, the resource type corresponds to one of a set of resource types including a first resource type associated with a symbol being available for communication by the first relay node, a second resource type associated with the symbol being unavailable for communication by the first relay node, and a third resource type associated with the symbol being conditionally available for communication by the first relay node.

Additionally, or alternatively, the communications manager 820 may support wireless communication at a control node in accordance with examples as disclosed herein. The resource configuration indication component 835 may be configured as or otherwise support a means for transmitting, to a first relay node, an indication 837 of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. In some examples, resource configuration indication component 835 may transmit, to resource configuration activation component 825, an indication 838 of the set of resource configurations. In some examples, the resource configuration activation component 825 may be configured as or otherwise support a means for transmitting, to the first relay node, an indication 827 to communicate according to a first resource configuration of the set of resource configurations. In some examples, resource configuration indication component may be configured to receive an indication 836 of the set of resource configurations.

In some examples, the resource configuration indication component 835 may be configured as or otherwise support a means for receiving the indication of the set of resource configurations for the first relay node from a parent node of the control node or a central control node.

In some examples, the resource configuration activation component 825 may be configured as or otherwise support a means for receiving the indication to communicate according to the first resource configuration from a parent node of the control node or a central control node.

In some examples, the resource configuration activation component 825 may be configured as or otherwise support a means for transmitting, to the first relay node, an indication to communicate according to a second resource configuration of the set of resource configurations after transmitting the indication to communicate according to the first resource configuration.

In some examples, to support transmitting the indication to communicate according to the first resource configuration and the indication to communicate according to the second resource configuration, the resource configuration activation component 825 may be configured as or otherwise support a means for transmitting, to the first relay node, an indication to communicate according to a subset of the set of resource configurations, where the subset includes the first resource configuration and the second resource configuration.

In some examples, the subset of the set of resource configurations excludes at least one resource configuration of the set of resource configurations.

In some examples, the subset of the set of resource configurations includes each resource configuration of the set of resource configurations that is an uplink resource configuration or each resource configuration of the set of resource configurations that is a downlink resource configuration.

In some examples, the request component 840 may be configured as or otherwise support a means for receiving, from the first relay node, a request 841 to communicate according to the first resource configuration, where the indication to communicate according to the first resource configuration is transmitted based on receiving the request. In some examples, request component 840 may transmit an indication 843 of the request to resource configuration activation component 825.

In some examples, the resource configuration activation component 825 may be configured as or otherwise support a means for transmitting, to the first relay node, an indication to cease communicating according to the first resource configuration.

In some examples, the request component 840 may be configured as or otherwise support a means for receiving, from the first relay node, a request to cease communicating according to the first resource configuration, where transmitting the indication to cease communicating according to the first resource configuration is based on receiving the request.

In some examples, to support transmitting the indication to cease communicating according to the first resource configuration, the resource configuration activation component 825 may be configured as or otherwise support a means for transmitting, to the first relay node, an indication to cease communicating according to a subset of the set of resource configurations, where the subset of the set of resource configurations includes the first resource configuration.

In some examples, the subset of the set of resource configurations excludes at least one resource configuration of the set of resource configurations.

In some examples, the indication to communicate is provided via radio resource control signaling, medium access control (MAC) control element signaling, downlink control information signaling, F1 application protocol (FLAP) signaling, or a combination thereof.

In some examples, the indication to communicate includes an indication of one or more criteria for communicating according to the first resource configuration.

In some examples, the one or more criteria includes a detection of a collision between a transmission associated with the first resource configuration and another transmission, an interference metric being above a threshold amount, or both.

In some examples, the one or more criteria includes ultra-reliable low-latency communication traffic for the communicating.

In some examples, the one or more criteria includes a detection of entering a location or zone, a speed associated with the first relay node satisfying a threshold, or both.

In some examples, the resource block set associated with the first resource configuration at least partially overlaps in time, frequency, or both with the resource block set associated with a second resource configuration of the set of resource configurations.

In some examples, a first resource block set associated with the first resource configuration is non-overlapping in time and frequency with a second resource block set associated with a second resource configuration of the set of resource configurations.

In some examples, a first size of a first resource block set associated with the first resource configuration is the same as a second size of a second resource block set associated with a second resource configuration of the set of resource configurations.

In some examples, a first size of a first resource block set associated with the first resource configuration is different from a second size of a second resource block set associated with a second resource configuration of the set of resource configurations.

In some examples, a first time domain pattern associated with the first resource configuration is different from a second time domain pattern associated with a second resource configuration of the set of resource configurations.

In some examples, a first time domain pattern associated with the first resource configuration is the same as a second time domain pattern associated with a second resource configuration of the set of resource configurations.

In some examples, the resource type corresponds to one of a set of resource types including a first resource type associated with a symbol being available for communication by the first relay node, a second resource type associated with the symbol being unavailable for communication by the first relay node, and a third resource type associated with the symbol being conditionally available for communication by the first relay node.

In some examples, the second relay node is a child node of the first relay node.

In some examples, the control node includes a central control node or a parent node of the first relay node.

In some examples, the central control node includes an integrated access and backhaul donor central unit.

In some examples, the first relay node includes an integrated access and backhaul node.

Figure 9:
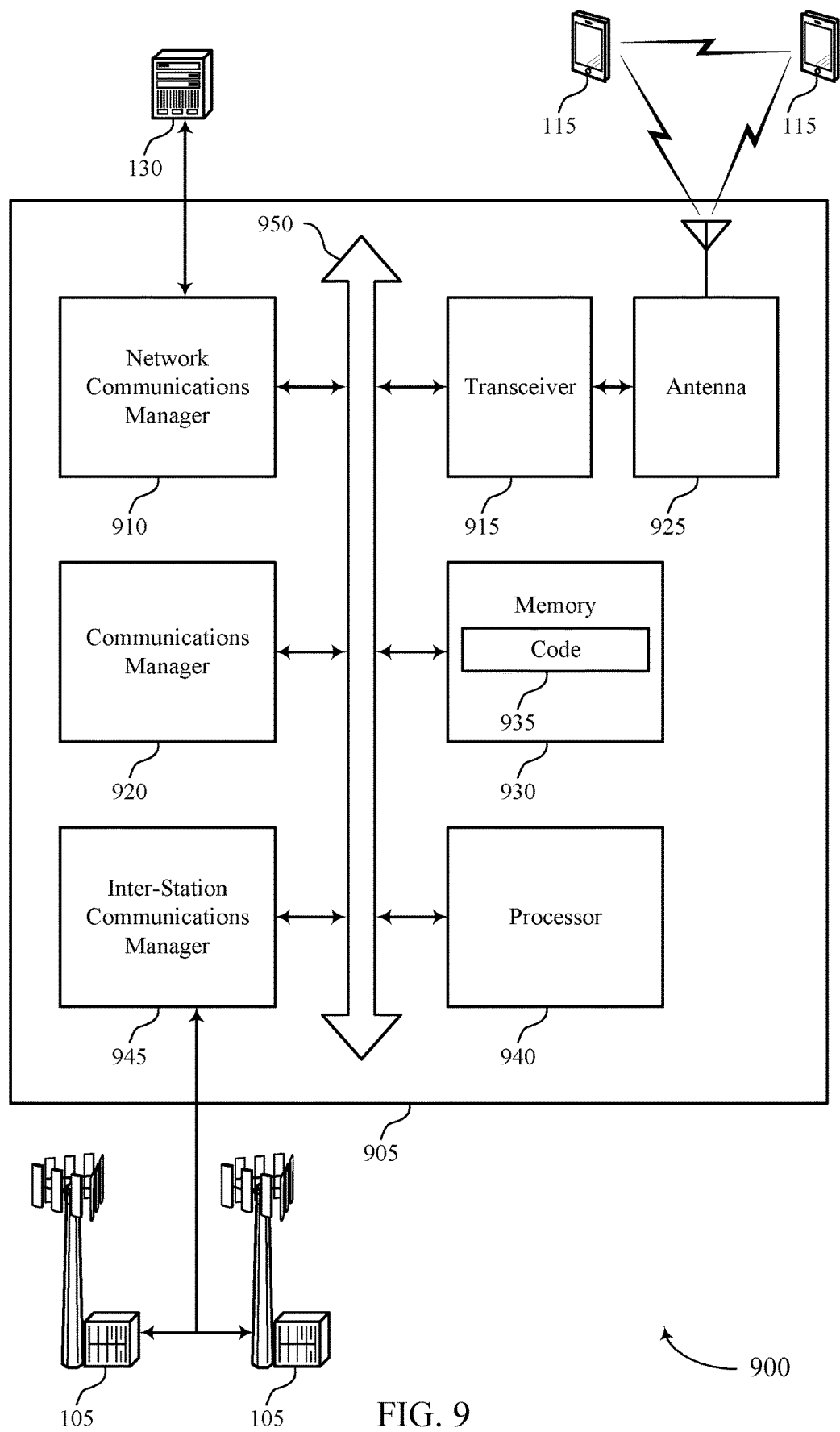
FIG. 9 shows a diagram of a system including a device that supports adaptive frequency domain resource configuration for a relay node in accordance with aspects of the present disclosure.

FIG. 9 shows a diagram of a system 900 including a device 905 that supports adaptive frequency domain resource configuration for a relay node in accordance with aspects of the present disclosure. The device 905 may be an example of or include the components of a device 605, a device 705, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random-access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting adaptive frequency domain resource configuration for a relay node). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a first relay node in accordance with examples as disclosed herein. For example, the communications manager 920 may be configured as or otherwise support a means for receiving, from a control node, an indication to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. The communications manager 920 may be configured as or otherwise support a means for communicating according to the first resource configuration based on receiving the indication to communicate according to the first resource configuration.

Additionally, or alternatively, the communications manager 920 may support wireless communication at a control node in accordance with examples as disclosed herein. For example, the communications manager 920 may be configured as or otherwise support a means for transmitting, to a first relay node, an indication of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. The communications manager 920 may be configured as or otherwise support a means for transmitting, to the first relay node, an indication to communicate according to a first resource configuration of the set of resource configurations.

By including or configuring the communications manager 920 in accordance with examples as described herein, the device 905 may support techniques for the device 605 to experience reduced latency, signaling overhead, or power consumption as compared to transmitting an updated resource configuration each time the device 605 or a child node of the device 605 is to update a resource configuration of the device 605 or the child node of the device 605, respectively In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of supporting adaptive frequency domain resource configuration for a relay node as described herein, or the processor 940 and the memory 930 may be otherwise configured to perform or support such operations.

Figure 10:
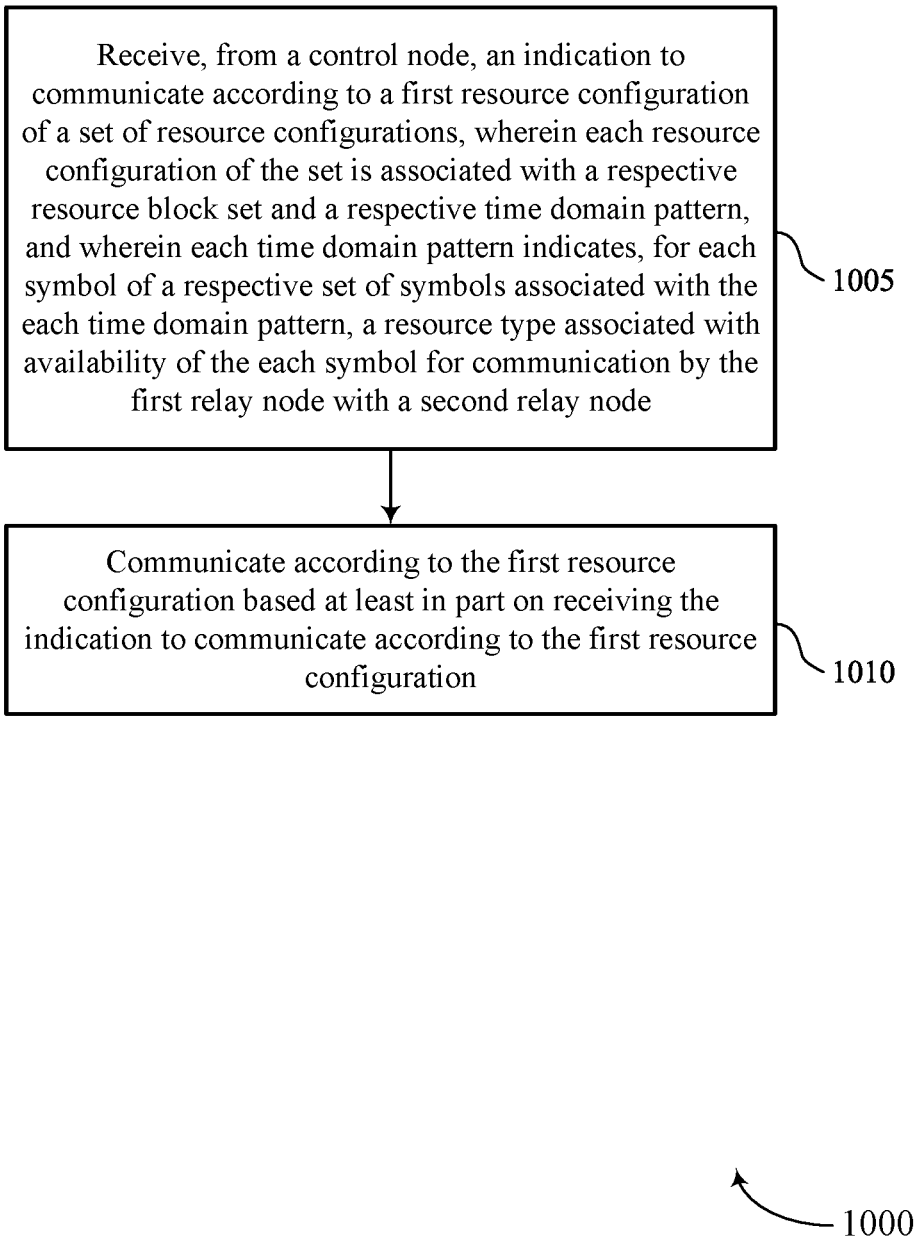
FIGS. 10 through 14 show flowcharts illustrating methods that supports adaptive frequency domain resource configuration for a relay node in accordance with aspects of the present disclosure.

FIG. 10 shows a flowchart illustrating a method 1000 that supports adaptive frequency domain resource configuration for a relay node in accordance with aspects of the present disclosure. The operations of the method 1000 may be implemented by a base station or its components as described herein. For example, the operations of the method 1000 may be performed by a base station 105 as described with reference to FIGS. 1 through 9. In some examples, a base station may execute a set of instructions to control the functional elements of the base station to perform the described functions. Additionally, or alternatively, the base station may perform aspects of the described functions using special-purpose hardware.

At 1005, the method may include receiving, from a control node, an indication to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. Receiving may include identifying time-frequency resources over which the indication is to be receiving and receiving the indication over the time-frequency resources. The operations of 1005 may be performed in accordance with examples as disclosed herein. In some examples, aspects of the operations of 1005 may be performed by a resource configuration activation component 825 as described with reference to FIG. 8.

At 1010, the method may include communicating according to the first resource configuration based on receiving the indication to communicate according to the first resource configuration. Communicating may include identifying time-frequency resources over which communicating is to occur and communicating over the time-frequency resources. The operations of 1010 may be performed in accordance with examples as disclosed herein. In some examples, aspects of the operations of 1010 may be performed by a communication component 830 as described with reference to FIG. 8.

Figure 11:
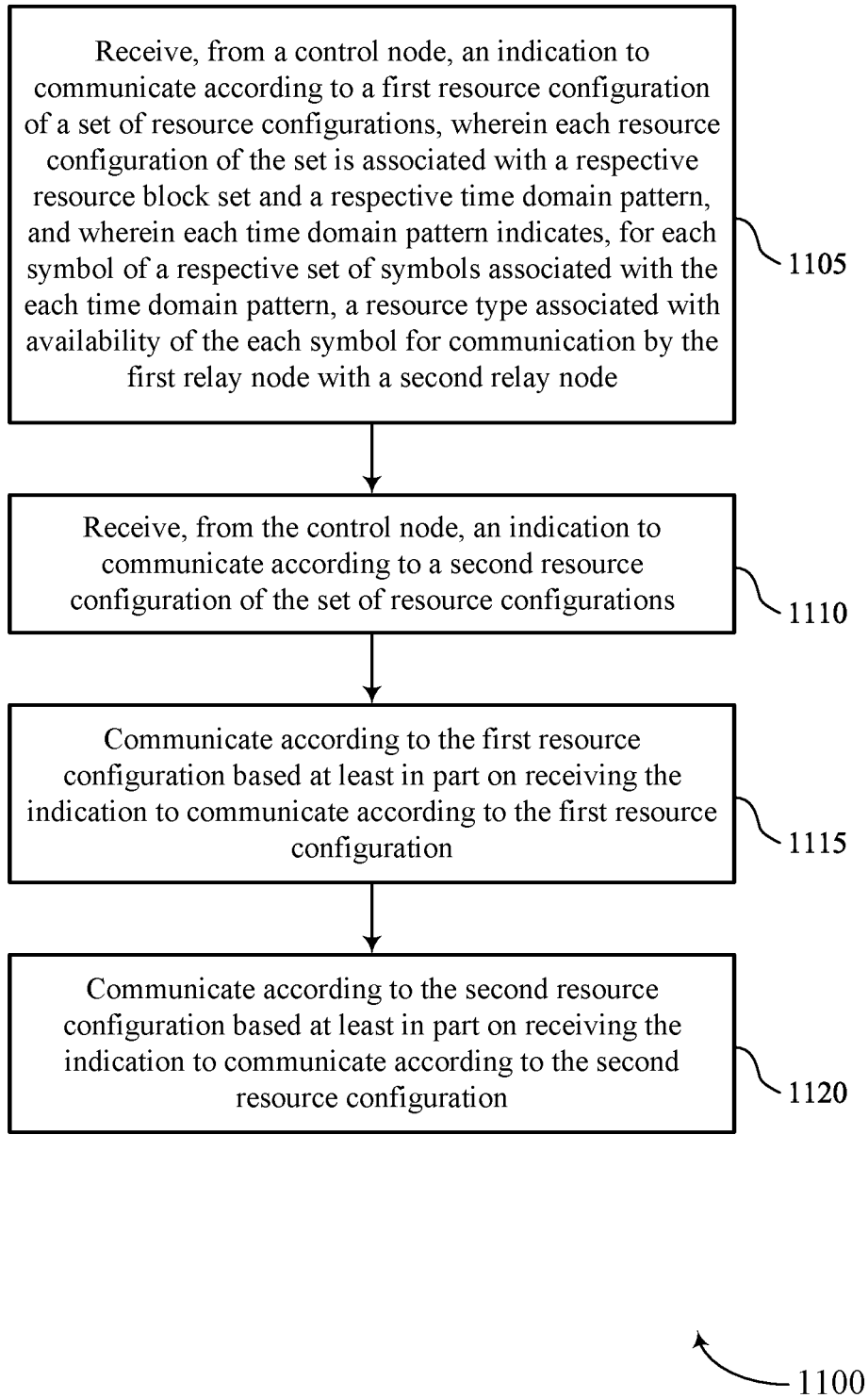

FIG. 11 shows a flowchart illustrating a method 1100 that supports adaptive frequency domain resource configuration for a relay node in accordance with aspects of the present disclosure. The operations of the method 1100 may be implemented by a base station or its components as described herein. For example, the operations of the method 1100 may be performed by a base station 105 as described with reference to FIGS. 1 through 9. In some examples, a base station may execute a set of instructions to control the functional elements of the base station to perform the described functions. Additionally, or alternatively, the base station may perform aspects of the described functions using special-purpose hardware.

At 1105, the method may include receiving, from a control node, an indication to communicate according to a first resource configuration of a set of resource configurations, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. Receiving may include identifying time-frequency resources over which the indication is to be receiving and receiving the indication over the time-frequency resources. The operations of 1105 may be performed in accordance with examples as disclosed herein. In some examples, aspects of the operations of 1105 may be performed by a resource configuration activation component 825 as described with reference to FIG. 8.

At 1110, the method may include receiving, from the control node, an indication to communicate according to a second resource configuration of the set of resource configurations. Receiving may include identifying time-frequency resources over which the indication is to be receiving and receiving the indication over the time-frequency resources. The operations of 1110 may be performed in accordance with examples as disclosed herein. In some examples, aspects of the operations of 1110 may be performed by a resource configuration activation component 825 as described with reference to FIG. 8.

At 1115, the method may include communicating according to the first resource configuration based on receiving the indication to communicate according to the first resource configuration. Communicating may include identifying time-frequency resources over which communicating is to occur and communicating over the time-frequency resources. The operations of 1115 may be performed in accordance with examples as disclosed herein. In some examples, aspects of the operations of 1115 may be performed by a communication component 830 as described with reference to FIG. 8.

At 1120, the method may include communicating according to the second resource configuration based on receiving the indication to communicate according to the second resource configuration. Communicating may include identifying time-frequency resources over which communicating is to occur and communicating over the time-frequency resources. The operations of 1120 may be performed in accordance with examples as disclosed herein. In some examples, aspects of the operations of 1120 may be performed by a communication component 830 as described with reference to FIG. 8.

Figure 12:
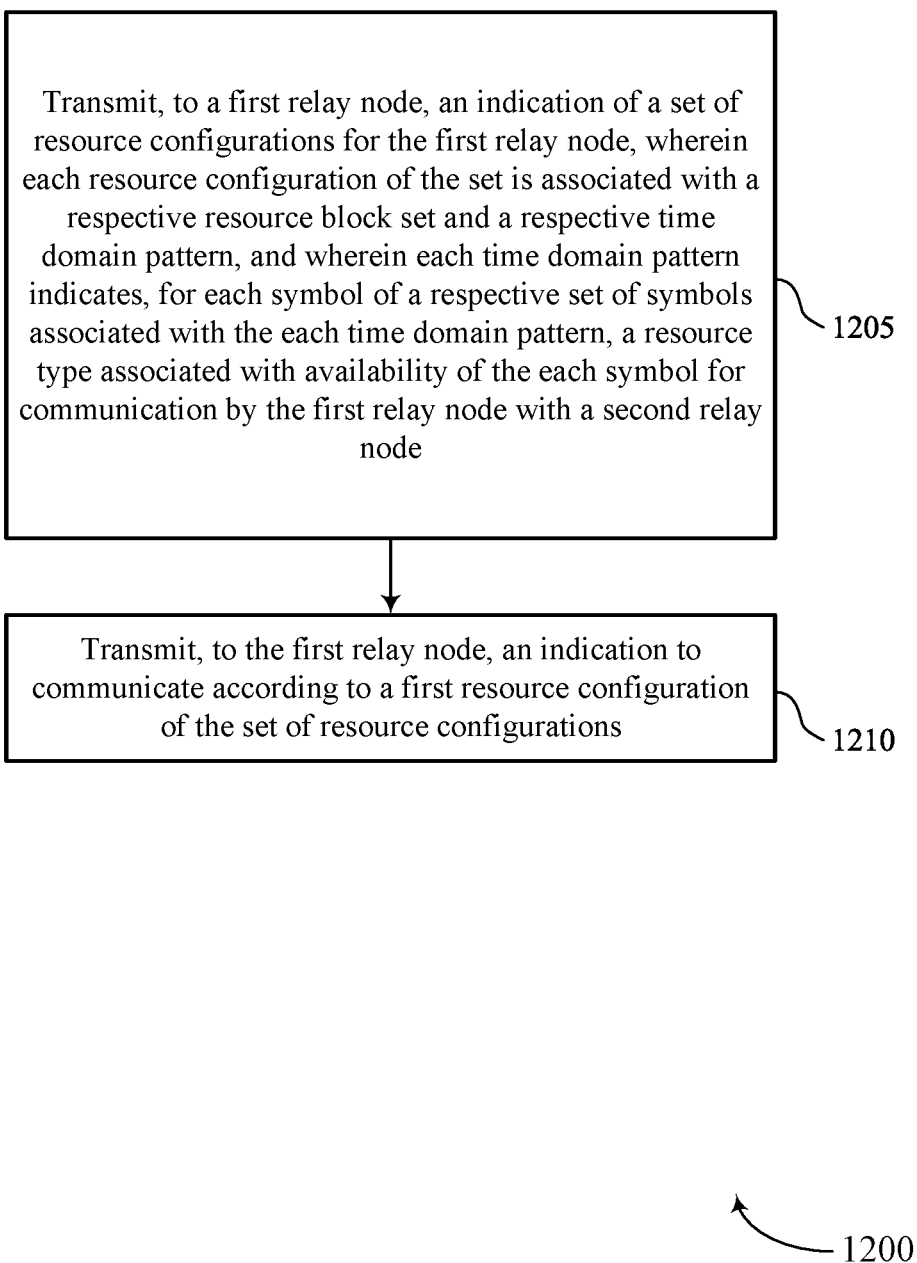

FIG. 12 shows a flowchart illustrating a method 1200 that supports adaptive frequency domain resource configuration for a relay node in accordance with aspects of the present disclosure. The operations of the method 1200 may be implemented by a base station or its components as described herein. For example, the operations of the method 1200 may be performed by a base station 105 as described with reference to FIGS. 1 through 9. In some examples, a base station may execute a set of instructions to control the functional elements of the base station to perform the described functions. Additionally, or alternatively, the base station may perform aspects of the described functions using special-purpose hardware.

At 1205, the method may include transmitting, to a first relay node, an indication of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. Transmitting may include identifying time-frequency resources over which the indication is to be transmitted and transmitting the indication over the time-frequency resources. The operations of 1205 may be performed in accordance with examples as disclosed herein. In some examples, aspects of the operations of 1205 may be performed by a resource configuration indication component 835 as described with reference to FIG. 8.

At 1210, the method may include transmitting, to the first relay node, an indication to communicate according to a first resource configuration of the set of resource configurations. Transmitting may include identifying time-frequency resources over which the indication is to be transmitted and transmitting the indication over the time-frequency resources. The operations of 1210 may be performed in accordance with examples as disclosed herein. In some examples, aspects of the operations of 1210 may be performed by a resource configuration activation component 825 as described with reference to FIG. 8.

Figure 13:
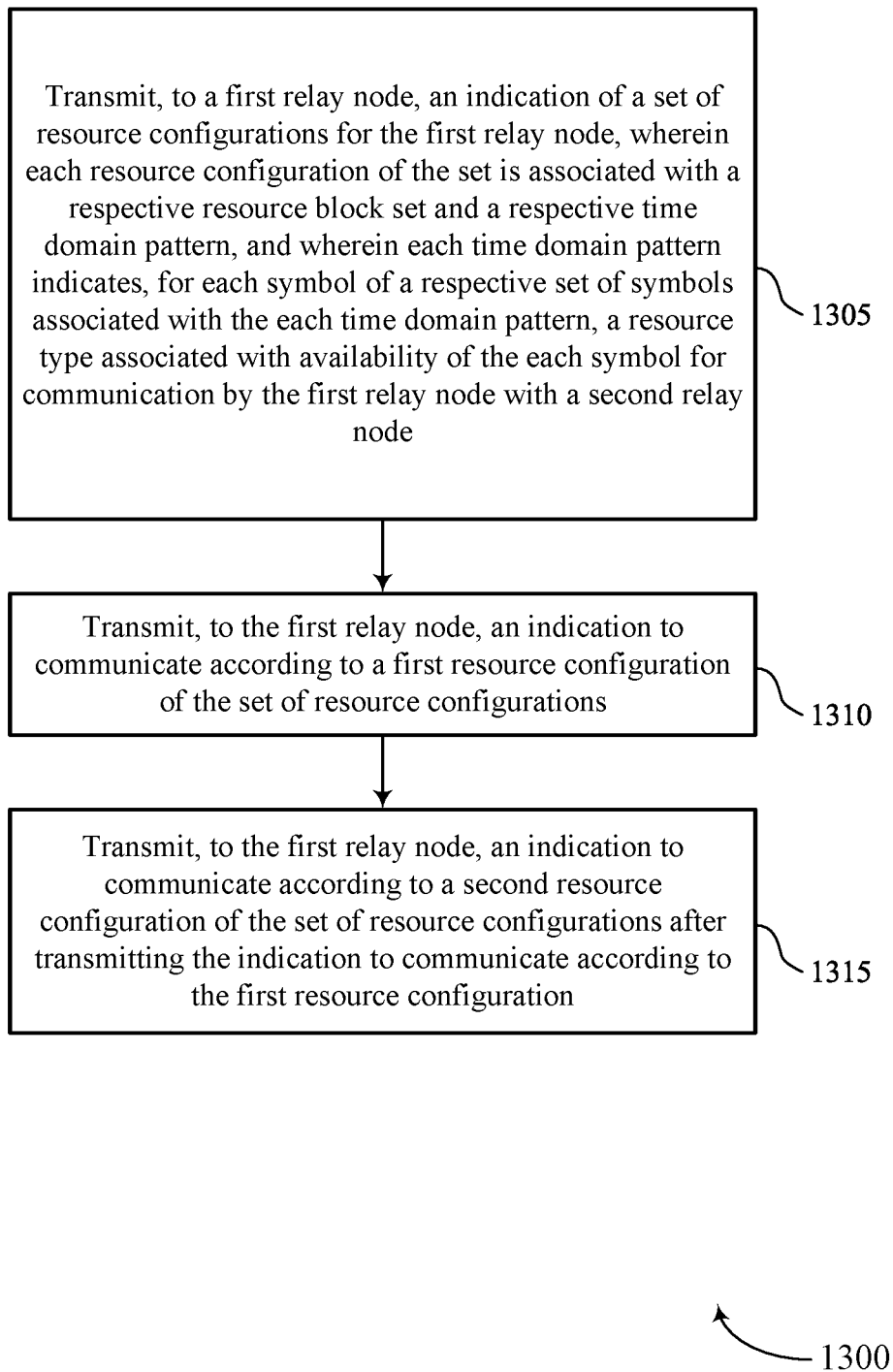

FIG. 13 shows a flowchart illustrating a method 1300 that supports adaptive frequency domain resource configuration for a relay node in accordance with aspects of the present disclosure. The operations of the method 1300 may be implemented by a base station or its components as described herein. For example, the operations of the method 1300 may be performed by a base station 105 as described with reference to FIGS. 1 through 9. In some examples, a base station may execute a set of instructions to control the functional elements of the base station to perform the described functions. Additionally, or alternatively, the base station may perform aspects of the described functions using special-purpose hardware.

At 1305, the method may include transmitting, to a first relay node, an indication of a set of resource configurations for the first relay node, where each resource configuration of the set is associated with a respective resource block set and a respective time domain pattern, and where each time domain pattern indicates, for each symbol of a respective set of symbols associated with the each time domain pattern, a resource type associated with availability of the each symbol for communication by the first relay node with a second relay node. Transmitting may include identifying time-frequency resources over which the indication is to be transmitted and transmitting the indication over the time-frequency resources. The operations of 1305 may be performed in accordance with examples as disclosed herein. In some examples, aspects of the operations of 1305 may be performed by a resource configuration indication component 835 as described with reference to FIG. 8.

At 1310, the method may include transmitting, to the first relay node, an indication to communicate according to a first resource configuration of the set of resource configurations. Transmitting may include identifying time-frequency resources over which the indication is to be transmitted and transmitting the indication over the time-frequency resources. The operations of 1310 may be performed in accordance with examples as disclosed herein. In some examples, aspects of the operations of 1310 may be performed by a resource configuration activation component 825 as described with reference to FIG. 8.

At 1315, the method may include transmitting, to the first relay node, an indication to communicate according to a second resource configuration of the set of resource configurations after transmitting the indication to communicate according to the first resource configuration. Transmitting may include identifying time-frequency resources over which the indication is to be transmitted and transmitting the indication over the time-frequency resources. The operations of 1315 may be performed in accordance with examples as disclosed herein. In some examples, aspects of the operations of 1315 may be performed by a resource configuration activation component 825 as described with reference to FIG. 8.

Figure 14:
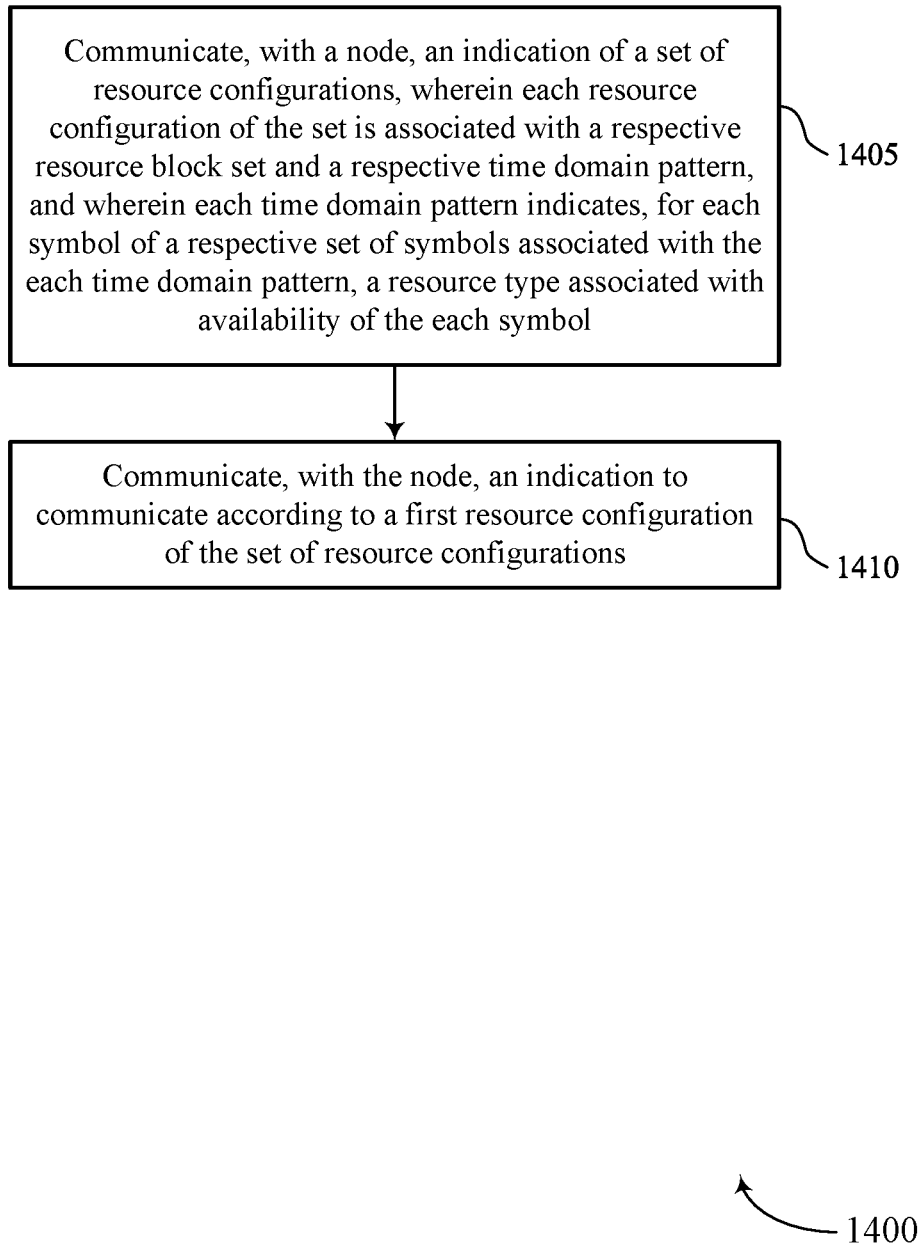

FIG. 14 shows a flowchart illustrating a method 1400 that supports adaptive frequency domain resource configuration for a relay node in accordance with aspects of the present disclosure. The operations of the method 1400 may be implemented by a base station or its components as described herein. For example, the operations of the method 1400 may be performed by a base station 105 as described with reference to FIGS. 1 through 9. In some examples, a base station may execute a set of instructions to control the functional elements of the base station to perform the described functions. Additionally, or alternatively, the base station may perform aspects of the described functions using special-purpose hardware.

At 1405, the method may include communicating, with a node, an indication of a set of resource configurations, wherein each resource configuration of the set is associated with a respective resource block set and a respective time domain pattern, and wherein each time domain pattern indicates, for each symbol of a respective set of symbols associated with the each time domain pattern, a resource type associated with availability of the each symbol. Communicating may include identifying time-frequency resources over which communicating is to occur and communicating over the time-frequency resources. The operations of 1405 may be performed in accordance with examples as disclosed herein. In some examples, aspects of the operations of 1405 may be performed by a resource configuration indication component 835 as described with reference to FIG. 8.

At 1410, the method may include communicating, with the node, an indication to communicate according to a first resource configuration of the set of resource configurations. Communicating may include identifying time-frequency resources over which communicating is to occur and communicating over the time-frequency resources. The operations of 1410 may be performed in accordance with examples as disclosed herein. In some examples, aspects of the operations of 1410 may be performed by a resource configuration activation component 825 as described with reference to FIG. 8

The following provides an overview of aspects of the present disclosure:

Aspect 1: A method for wireless communication at a first relay node, comprising: receiving, from a control node, an indication to communicate according to a first resource configuration of a set of resource configurations, wherein each resource configuration of the set is associated with a respective resource block set and a respective time domain pattern, and wherein each time domain pattern indicates, for each symbol of a respective set of symbols associated with the each time domain pattern, a resource type associated with availability of the each symbol for communication by the first relay node with a second relay node; and communicating according to the first resource configuration based at least in part on receiving the indication to communicate according to the first resource configuration.

Aspect 2: The method of aspect 1, further comprising: receiving, from the control node, an indication to communicate according to a second resource configuration of the set of resource configurations; and communicating according to the second resource configuration based at least in part on receiving the indication to communicate according to the second resource configuration.

Aspect 3: The method of aspect 2, wherein receiving the indication to communicate according to the first resource configuration and the indication to communicate according to the second resource configuration comprises: receiving, from the control node, an indication to communicate according to a subset of the set of resource configurations, wherein the subset comprises the first resource configuration and the second resource configuration.

Aspect 4: The method of aspect 3, wherein the subset of the set of resource configurations excludes at least one resource configuration of the set of resource configurations.

Aspect 5: The method of aspect 4, further comprising: refraining from communicating according to the at least one resource configuration based at least in part on the subset of the set of resource configurations excluding the at least one resource configuration.

Aspect 6: The method of any of aspects 4 through 5, further comprising: determining a default resource type for the at least one resource configuration of the set of resource configurations.

Aspect 7: The method of any of aspects 3 through 6, wherein the subset of the set of resource configurations comprises each resource configuration of the set of resource configurations that is an uplink resource configuration or each resource configuration of the set of resource configurations that is a downlink resource configuration.

Aspect 8: The method of any of aspects 2 through 7, wherein a first set of symbols associated with the first resource configuration at least partially overlaps with a second set of symbols associated with the second resource configuration in time, frequency, or both.

Aspect 9: The method of any of aspects 2 through 8, wherein a first set of symbols associated with the first resource configuration is non-overlapping with a second set of symbols associated with the second resource configuration in time, frequency, or both.

Aspect 10: The method of any of aspects 1 through 9, further comprising: receiving, from the control node, an indication to communicate according to a second resource configuration of the set of resource configurations after receiving the indication to communicate according to the first resource configuration; ceasing communicating according to the first resource configuration based at least in part on receiving the indication to communicate according to the second resource configuration; and communicating according to the second resource configuration based at least in part on receiving the indication to communicate according to the second resource configuration.

Aspect 11: The method of any of aspects 1 through 10, further comprising: transmitting, to the control node, a request to communicate according to the first resource configuration, wherein the indication to communicate according to the first resource configuration is received based at least in part on transmitting the request.

Aspect 12: The method of any of aspects 1 through 11, further comprising: receiving, from the control node, an indication to cease communicating according to the first resource configuration.

Aspect 13: The method of aspect 12, further comprising: transmitting, to the control node, a request to cease communicating according to the first resource configuration, wherein receiving the indication to cease communicating according to the first resource configuration is based at least in part on transmitting the request.

Aspect 14: The method of any of aspects 12 through 13, wherein receiving the indication to cease communicating according to the first resource configuration comprises: receiving, from the control node, an indication to cease communicating according to a subset of the set of resource configurations, wherein the subset of the set of resource configurations comprises the first resource configuration.

Aspect 15: The method of aspect 14, wherein the subset of the set of resource configurations excludes at least one resource configuration of the set of resource configurations.

Aspect 16: The method of aspect 15, further comprising: communicating according to the at least one resource configuration of the set of resource configurations based at least in part on the subset of the set of resource configurations excluding the at least one resource configuration.

Aspect 17: The method of any of aspects 1 through 16, further comprising: setting, based at least in part on receiving the indication to communicate according to the first resource configuration, a timer, wherein communicating according to the first resource configuration occurs while the timer is running.

Aspect 18: The method of aspect 17, further comprising: ceasing communicating according to the first resource configuration based at least in part on the timer stopping.

Aspect 19: The method of any of aspects 17 through 18, further comprising: resetting the timer while the timer is running based at least in part on one or more criteria.

Aspect 20: The method of any of aspects 1 through 19, further comprising: determining a default resource type for a set of resources excluded from each resource configuration of the set of resource configurations.

Aspect 21: The method of any of aspects 1 through 20, wherein the indication to communicate is provided via radio resource control signaling, medium access control (MAC) control element signaling, downlink control information signaling, F1 application protocol (F1AP) signaling, or a combination thereof.

Aspect 22: The method of any of aspects 1 through 21, wherein. the indication to communicate comprises an indication of one or more criteria for communicating according to the first resource configuration, and communicating according to the first resource configuration is based at least in part on whether the one or more criteria are satisfied Aspect 23: The method of aspect 22, wherein the one or more criteria comprises a detection of a collision between a transmission associated with the first resource configuration and another transmission, an interference metric being above a threshold amount, or both.

Aspect 24: The method of any of aspects 22 through 23, wherein the one or more criteria comprises ultra-reliable low-latency communication traffic for the communicating.

Aspect 25: The method of any of aspects 22 through 24, wherein the one or more criteria comprises a detection of entering a location or zone, a speed associated with the first relay node satisfying a threshold, or both.

Aspect 26: The method of any of aspects 1 through 25, wherein a first resource block set associated with the first resource configuration at least partially overlaps in time, frequency, or both with a second resource block set associated with a second resource configuration of the set of resource configurations.

Aspect 27: The method of any of aspects 1 through 26, wherein a first resource block set associated with the first resource configuration is non-overlapping in time and frequency with a second resource block set associated with a second resource configuration of the set of resource configurations.

Aspect 28: The method of any of aspects 1 through 27, wherein a first size of a first resource block set associated with the first resource configuration is the same as a second size of a second resource block set associated with a second resource configuration of the set of resource configurations.

Aspect 29: The method of any of aspects 1 through 28, wherein a first size of a first resource block set associated with the first resource configuration is different from a second size of a second resource block set associated with a second resource configuration of the set of resource configurations.

Aspect 30: The method of any of aspects 1 through 29, wherein a first time domain pattern associated with the first resource configuration is different from a second time domain pattern associated with a second resource configuration of the set of resource configurations.

Aspect 31: The method of any of aspects 1 through 30, wherein a first time domain pattern associated with the first resource configuration is the same as a second time domain pattern associated with a second resource configuration of the set of resource configurations.

Aspect 32: The method of any of aspects 1 through 31, wherein the second relay node is a child node of the first relay node.

Aspect 33: The method of any of aspects 1 through 32, wherein the control node comprises a central control node or a parent node of the first relay node.

Aspect 34: The method of aspect 33, wherein the central control node comprises an integrated access and backhaul donor central unit.

Aspect 35: The method of any of aspects 1 through 34, wherein the first relay node comprises an integrated access and backhaul node.

Aspect 36: The method of any of aspects 1 through 35, wherein the resource type corresponds to one of a set of resource types including a first resource type associated with a symbol being available for communication by the first relay node, a second resource type associated with the symbol being unavailable for communication by the first relay node, and a third resource type associated with the symbol being conditionally available for communication by the first relay node.

Aspect 37: A method for wireless communication at a control node, comprising: transmitting, to a first relay node, an indication of a set of resource configurations for the first relay node, wherein each resource configuration of the set is associated with a respective resource block set and a respective time domain pattern, and wherein each time domain pattern indicates, for each symbol of a respective set of symbols associated with the each time domain pattern, a resource type associated with availability of the each symbol for communication by the first relay node with a second relay node; and transmitting, to the first relay node, an indication to communicate according to a first resource configuration of the set of resource configurations.

Aspect 38: The method of aspect 37, further comprising: receiving the indication of the set of resource configurations for the first relay node from a parent node of the control node or a central control node.

Aspect 39: The method of any of aspects 37 through 38, further comprising: receiving the indication to communicate according to the first resource configuration from a parent node of the control node or a central control node.

Aspect 40: The method of any of aspects 37 through 39, further comprising: transmitting, to the first relay node, an indication to communicate according to a second resource configuration of the set of resource configurations after transmitting the indication to communicate according to the first resource configuration.

Aspect 41: The method of aspect 40, wherein transmitting the indication to communicate according to the first resource configuration and the indication to communicate according to the second resource configuration comprises: transmitting, to the first relay node, an indication to communicate according to a subset of the set of resource configurations, wherein the subset comprises the first resource configuration and the second resource configuration.

Aspect 42: The method of aspect 41, wherein the subset of the set of resource configurations excludes at least one resource configuration of the set of resource configurations.

Aspect 43: The method of any of aspects 41 through 42, wherein the subset of the set of resource configurations comprises each resource configuration of the set of resource configurations that is an uplink resource configuration or each resource configuration of the set of resource configurations that is a downlink resource configuration.

Aspect 44: The method of any of aspects 37 through 43, further comprising: receiving, from the first relay node, a request to communicate according to the first resource configuration, wherein the indication to communicate according to the first resource configuration is transmitted based at least in part on receiving the request.

Aspect 45: The method of any of aspects 37 through 44, further comprising: transmitting, to the first relay node, an indication to cease communicating according to the first resource configuration.

Aspect 46: The method of aspect 45, further comprising: receiving, from the first relay node, a request to cease communicating according to the first resource configuration, wherein transmitting the indication to cease communicating according to the first resource configuration is based at least in part on receiving the request.

Aspect 47: The method of any of aspects 45 through 46, wherein transmitting the indication to cease communicating according to the first resource configuration comprises: transmitting, to the first relay node, an indication to cease communicating according to a subset of the set of resource configurations, wherein the subset of the set of resource configurations comprises the first resource configuration.

Aspect 48: The method of aspect 47, wherein the subset of the set of resource configurations excludes at least one resource configuration of the set of resource configurations.

Aspect 49: The method of any of aspects 37 through 48, wherein the indication to communicate is provided via radio resource control signaling, medium access control (MAC) control element signaling, downlink control information signaling, F1 application protocol (F1AP) signaling, or a combination thereof.

Aspect 50: The method of any of aspects 37 through 49, wherein the indication to communicate comprises an indication of one or more criteria for communicating according to the first resource configuration.

Aspect 51: The method of aspect 50, wherein the one or more criteria comprises a detection of a collision between a transmission associated with the first resource configuration and another transmission, an interference metric being above a threshold amount, or both.

Aspect 52: The method of any of aspects 50 through 51, wherein the one or more criteria comprises ultra-reliable low-latency communication traffic for the communicating.

Aspect 53: The method of any of aspects 50 through 52, wherein the one or more criteria comprises a detection of entering a location or zone, a speed associated with the first relay node satisfying a threshold, or both.

Aspect 54: The method of any of aspects 37 through 53, wherein the resource block set associated with the first resource configuration at least partially overlaps in time, frequency, or both with the resource block set associated with a second resource configuration of the set of resource configurations.

Aspect 55: The method of any of aspects 37 through 54, wherein a first resource block set associated with the first resource configuration is non-overlapping in time and frequency with a second resource block set associated with a second resource configuration of the set of resource configurations.

Aspect 56: The method of any of aspects 37 through 55, wherein a first size of a first resource block set associated with the first resource configuration is the same as a second size of a second resource block set associated with a second resource configuration of the set of resource configurations.

Aspect 57: The method of any of aspects 37 through 56, wherein a first size of a first resource block set associated with the first resource configuration is different from a second size of a second resource block set associated with a second resource configuration of the set of resource configurations.

Aspect 58: The method of any of aspects 37 through 57, wherein a first time domain pattern associated with the first resource configuration is different from a second time domain pattern associated with a second resource configuration of the set of resource configurations.

Aspect 59: The method of any of aspects 37 through 58, wherein a first time domain pattern associated with the first resource configuration is the same as a second time domain pattern associated with a second resource configuration of the set of resource configurations.

Aspect 60: The method of any of aspects 37 through 59, wherein the resource type corresponds to one of a set of resource types including a first resource type associated with a symbol being available for communication by the first relay node, a second resource type associated with the symbol being unavailable for communication by the first relay node, and a third resource type associated with the symbol being conditionally available for communication by the first relay node.

Aspect 61: The method of any of aspects 37 through 60, wherein the second relay node is a child node of the first relay node.

Aspect 62: The method of any of aspects 37 through 61, wherein the control node comprises a central control node or a parent node of the first relay node.

Aspect 63: The method of aspect 62, wherein the central control node comprises an integrated access and backhaul donor central unit.

Aspect 64: The method of any of aspects 37 through 63, wherein the first relay node comprises an integrated access and backhaul node.

Aspect 65: An apparatus for wireless communication at a first relay node, comprising a processor; memory coupled with the processor; and instructions stored in the memory and executable by the processor to cause the apparatus to perform a method of any of aspects 1 through 36.

Aspect 66: An apparatus for wireless communication at a first relay node, comprising at least one means for performing a method of any of aspects 1 through 36.

Aspect 67: A non-transitory computer-readable medium storing code for wireless communication at a first relay node, the code comprising instructions executable by a processor to perform a method of any of aspects 1 through 36.

Aspect 68: An apparatus for wireless communication at a control node, comprising a processor; memory coupled with the processor; and instructions stored in the memory and executable by the processor to cause the apparatus to perform a method of any of aspects 37 through 64.

Aspect 69: An apparatus for wireless communication at a control node, comprising at least one means for performing a method of any of aspects 37 through 64.

Aspect 70: A non-transitory computer-readable medium storing code for wireless communication at a control node, the code comprising instructions executable by a processor to perform a method of any of aspects 37 through 64.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first relay node, comprising:
   one or more processors;
   one or more memories coupled with the one or more processors; and
   instructions stored in the one or more memories and executable by the one or more processors to cause the apparatus to:

receive, from a control node, an indication to activate a first resource configuration of a set of resource configurations, wherein each resource configuration of the set of resource configurations is associated with a respective resource block set and a respective time domain pattern, and wherein each time domain pattern indicates, for each symbol of a respective set of symbols associated with the each time domain pattern, a resource type associated with availability of the each symbol for communication by the first relay node with a second relay node; and communicate according to the first resource configuration based at least in part on receiving the indication to activate the first resource configuration.

2. The apparatus of claim 1, wherein the resource type corresponds to one of a set of resource types including a first resource type associated with a symbol being available for communication by the first relay node, a second resource type associated with the symbol being unavailable for communication by the first relay node, and a third resource type associated with the symbol being conditionally available for communication by the first relay node.

3. The apparatus of claim 1, wherein the instructions are further executable by the one or more processors to cause the apparatus to:

determine a default resource type for a set of resources excluded from each resource configuration of the set of resource configurations.

4. The apparatus of claim 1, wherein the indication to activate the first resource configuration is provided via radio resource control signaling, medium access control (MAC) control element signaling, downlink control information signaling, F1 application protocol (F1AP) signaling, or a combination thereof.

5. The apparatus of claim 1, wherein:

the indication to activate the first resource configuration comprises an indication of one or more criteria for communicating according to the first resource configuration, wherein the one or more criteria comprises a detection of a collision between a transmission associated with the first resource configuration and another transmission, an interference metric being above a threshold amount, ultra-reliable low-latency communication traffic for the communicating, a detection of entering a location or zone, a speed associated with the first relay node satisfying a threshold, or any combination thereof, and wherein communicating according to the first resource configuration is based at least in part on whether the one or more criteria are satisfied.

6. The apparatus of claim 1, wherein the instructions are further executable by the one or more processors to cause the apparatus to:

receive, from the control node, an indication to communicate according to a second resource configuration of the set of resource configurations; and communicate according to the second resource configuration based at least in part on receiving the indication to communicate according to the second resource configuration.

7. The apparatus of claim 1, wherein the instructions are further executable by the one or more processors to cause the apparatus to:

receive, from the control node, an indication to communicate according to a second resource configuration of the set of resource configurations after receiving the indication to activate the first resource configuration;

cease communicating according to the first resource configuration based at least in part on receiving the indication to communicate according to the second resource configuration; and communicate according to the second resource configuration based at least in part on receiving the indication to communicate according to the second resource configuration.

8. The apparatus of claim 1, wherein a first resource block set associated with the first resource configuration is non-overlapping in time and frequency with a second resource block set associated with a second resource configuration of the set of resource configurations.

9. The apparatus of claim 1, wherein a first size of a first resource block set associated with the first resource configuration is the same as a second size of a second resource block set associated with a second resource configuration of the set of resource configurations.

10. The apparatus of claim 1, wherein a first size of a first resource block set associated with the first resource configuration is different from a second size of a second resource block set associated with a second resource configuration of the set of resource configurations.

11. The apparatus of claim 1, wherein a first time domain pattern associated with the first resource configuration is different from a second time domain pattern associated with a second resource configuration of the set of resource configurations.

12. The apparatus of claim 1, wherein a first time domain pattern associated with the first resource configuration is the same as a second time domain pattern associated with a second resource configuration of the set of resource configurations.

13. The apparatus of claim 1, wherein the second relay node is a child node of the first relay node and the control node comprises a central control node or a parent node of the first relay node, and wherein the central control node comprises an integrated access and backhaul donor central unit and the first relay node comprises an integrated access and backhaul node.

14. An apparatus for wireless communication at a control node, comprising:

one or more processors;

one or more memories coupled with the one or more processors; and instructions stored in the memory one or more memories and executable by the one or more processors to cause the apparatus to:

transmit, to a first relay node, an indication of a set of resource configurations for the first relay node, wherein each resource configuration of the set of resource configurations is associated with a respective resource block set and a respective time domain pattern, and wherein each time domain pattern indicates, for each symbol of a respective set of symbols associated with the each time domain pattern, a resource type associated with availability of the each symbol for communication by the first relay node with a second relay node; and transmit, to the first relay node, an indication to activate a first resource configuration of the set of resource configurations.

15. The apparatus of claim 14, wherein the resource type corresponds to one of a set of resource types including a first resource type associated with a symbol being available for communication by the first relay node, a second resource type associated with the symbol being unavailable for communication by the first relay node, and a third resource type associated with the symbol being conditionally available for communication by the first relay node.

16. The apparatus of claim 14, wherein the indication to activate the first resource configuration is provided via radio resource control signaling, medium access control (MAC) control element signaling, downlink control information signaling, F1 application protocol (F1AP) signaling, or a combination thereof.

17. The apparatus of claim 14, wherein the indication to activate the first resource configuration comprises an indication of one or more criteria for communicating according to the first resource configuration, wherein the one or more criteria comprises a detection of a collision between a transmission associated with the first resource configuration and another transmission, an interference metric being above a threshold amount, ultra-reliable low-latency communication traffic for the communicating, a detection of entering a location or zone, a speed associated with the first relay node satisfying a threshold, or any combination thereof.

18. The apparatus of claim 14, wherein the instructions are further executable by the one or more processors to cause the apparatus to:
receive the indication of the set of resource configurations for the first relay node from a parent node of the control node or a central control node.

19. The apparatus of claim 14, wherein the instructions are further executable by the one or more processors to cause the apparatus to:
receive the indication to activate the first resource configuration according to the first resource configuration from a parent node of the control node or a central control node.

20. The apparatus of claim 14, wherein the instructions are further executable by the one or more processors to cause the apparatus to:
transmit, to the first relay node, an indication to communicate according to a second resource configuration of the set of resource configurations after transmitting the indication to activate the first resource configuration.

21. The apparatus of claim 14, wherein the instructions are further executable by the one or more processors to cause the apparatus to:
receive, from the first relay node, a request to communicate according to the first resource configuration, wherein the indication to activate the first resource configuration is transmitted based at least in part on receiving the request.

22. The apparatus of claim 14, wherein the instructions are further executable by the one or more processors to cause the apparatus to:
transmit, to the first relay node, an indication to to deactivate the first resource configuration.

23. The apparatus of claim 14, wherein a first resource block set associated with the first resource configuration is non-overlapping in time and frequency with a second resource block set associated with a second resource configuration of the set of resource configurations.

24. The apparatus of claim 14, wherein a first size of a first resource block set associated with the first resource configuration is the same as a second size of a second resource block set associated with a second resource configuration of the set of resource configurations.

25. The apparatus of claim 14, wherein a first size of a first resource block set associated with the first resource configuration is different from a second size of a second resource block set associated with a second resource configuration of the set of resource configurations.

26. The apparatus of claim 14, wherein a first time domain pattern associated with the first resource configuration is different from a second time domain pattern associated with a second resource configuration of the set of resource configurations.

27. The apparatus of claim 14, wherein a first time domain pattern associated with the first resource configuration is the same as a second time domain pattern associated with a second resource configuration of the set of resource configurations.

28. The apparatus of claim 14, wherein the second relay node is a child node of the first relay node and the control node comprises a central control node or a parent node of the first relay node, and wherein the central control node comprises an integrated access and backhaul donor central unit and the first relay node comprises an integrated access and backhaul node.

29. A method for wireless communication at a first relay node, comprising:
receiving, from a control node, an indication to activate a first resource configuration of a set of resource configurations, wherein each resource configuration of the set of resource configurations is associated with a respective resource block set and a respective time domain pattern, and wherein each time domain pattern indicates, for each symbol of a respective set of symbols associated with the each time domain pattern, a resource type associated with availability of the each symbol for communication by the first relay node with a second relay node; and
communicating according to the first resource configuration based at least in part on receiving the indication to activate the first resource configuration.

30. A method for wireless communication at a control node, comprising:
transmitting, to a first relay node, an indication of a set of resource configurations for the first relay node, wherein each resource configuration of the set of resource configurations is associated with a respective resource block set and a respective time domain pattern, and wherein each time domain pattern indicates, for each symbol of a respective set of symbols associated with the each time domain pattern, a resource type associated with availability of the each symbol for communication by the first relay node with a second relay node; and
transmitting, to the first relay node, an indication to activate a first resource configuration of the set of resource configurations.

* * * * *